United States Patent [19]
Chang et al.

[11] Patent Number: 5,812,526
[45] Date of Patent: Sep. 22, 1998

[54] TRAFFIC CONTROL MECHANISM IN ATM COMMUNICATIONS NETWORK

[75] Inventors: Chung-Ju Chang, Taipei; Ray-Guang Cheng, Keelong; Tzung-Pao Lin, Kaohsiung; Ming-Chia Hsieh, Taipei; Yao-Tzung Wang, Hsinchu, all of Taiwan

[73] Assignee: Industrial Technology Research Institute, Hsinchu, Taiwan

[21] Appl. No.: 576,808

[22] Filed: Dec. 21, 1995

[51] Int. Cl.$^6$ .............................. H04J 3/14; H04L 12/56
[52] U.S. Cl. ............................................ 370/230; 370/235
[58] Field of Search ................................... 370/229, 230, 370/232, 233, 234, 235, 395, 412, 415; 395/900, 903, 909

[56] References Cited

U.S. PATENT DOCUMENTS

| | | | |
|---|---|---|---|
| 4,984,264 | 1/1991 | Katsube | 370/230 |
| 5,150,358 | 9/1992 | Punj et al. . | |
| 5,179,551 | 1/1993 | Tuner . | |
| 5,179,556 | 1/1993 | Turner . | |
| 5,210,743 | 5/1993 | Eilenberger et al. . | |
| 5,229,990 | 7/1993 | Teraslinna . | |
| 5,251,205 | 10/1993 | Callon er al. . | |
| 5,271,003 | 12/1993 | Lee et al. . | |
| 5,274,360 | 12/1993 | Watanabe et al. . | |
| 5,280,480 | 1/1994 | Pitt et al. . | |
| 5,287,347 | 2/1994 | Spanke . | |
| 5,291,477 | 3/1994 | Liew . | |
| 5,295,137 | 3/1994 | Jurkevich . | |
| 5,307,413 | 4/1994 | Denzer . | |
| 5,311,513 | 5/1994 | Ahmadi et al. | 370/230 |
| 5,327,552 | 7/1994 | Liew . | |
| 5,335,269 | 8/1994 | Steinlicht . | |
| 5,341,366 | 8/1994 | Soumiya et al. . | |
| 5,359,538 | 10/1994 | Hui et al. . | |
| 5,369,707 | 11/1994 | Follendore, III . | |
| 5,381,407 | 1/1995 | Chao . | |
| 5,389,748 | 2/1995 | Burke et al. . | |
| 5,420,857 | 5/1995 | Jurkevich . | |
| 5,421,031 | 5/1995 | De Bey . | |
| 5,452,350 | 9/1995 | Reynolds et al. . | |
| 5,459,716 | 10/1995 | Fahim et al. . | |
| 5,461,615 | 10/1995 | Henrion . | |
| 5,463,616 | 10/1995 | Kruse et al. . | |
| 5,475,831 | 12/1995 | Yoshida et al. . | |
| 5,483,461 | 1/1996 | Lee et al. . | |
| 5,487,170 | 1/1996 | Bass et al. . | |
| 5,500,858 | 3/1996 | McKeown . | |

OTHER PUBLICATIONS

Thomas D. Ndousee: *Fuzzy Neural Control of Voice Cells in ATM Networks,* IEEE Journal On Selected Areas In Communications, vol. 12, No. 9, Dec., 1994, pp. 1488–1494.

Atsushi Hiramatsu, *ATM Communications Network Control by Neural Networks,* IEEE Transactions On Nueral Networks, vol. 1, No. 1, Mar., 1990, pp. 122–130.

Roch Guerin, Hamid Ahmadi, and Mahmoud Naghshineh, *Equivalent Capacity and Its Application to Bandwidth Allocation in High–Speed Networks,* IEEE Journal On Selected Areas In Communications, vol. 9, No. 7, Sep., 1991, pp. 968–981.

(List continued on next page.)

*Primary Examiner*—Chau Nguyen
*Attorney, Agent, or Firm*—Meltzer, Lippe, Goldstein, Wolf & Schlissel, P.C.

[57] ABSTRACT

A system and process are provided for controlling congestion at a node of an asynchronous transfer mode (ATM) communications network. The process and system utilize fuzzy logic in determining whether or not to "admit," i.e., allocate a virtual channel (VC) for, new communications (or calls) to the node. Fuzzy logic is also use to control the rate cells are transmitted to the node for communications already "admitted," i.e., for which a VC has already been allocated. The fuzzy logic rules for bandwidth estimation in admission control may be developed from an "equivalent capacity" model. The fuzzy logic rules for adjusting cell transmission rates may be developed from a "two-threshold" congestion control model.

14 Claims, 7 Drawing Sheets

OTHER PUBLICATIONS

San–qi Li and Song Chong, Fundamental Limits of Input Rate Control in High Speed Network, Dept. of Electrical and Computer Eng'g, University of Texas at Austin, pp. 662–671.

M. De Pryker, Asynchronous Transfer Mode Solution For BroadBand ISDN, 2d ed., ch. 2.4.5.4, pp. 84–87 (1995) discussed on p. 2.

Siemens Aktiengesellschaft, *Telephone Traffic Theory, Tables and Charts, Part 1,* 1970.

TRAFFIC CONTROL MECHANISM IN ATM COMMUNICATIONS NETWORK

FIELD OF THE INVENTION

The present invention relates to asynchronous transfer mode communication networks. In particular, the present invention relates to controlling the admission of new communications and controlling the transmission rate of each admitted communication to prevent congestion. Fuzzy logic is utilized to determine whether to accept new communications and to control the transmission rate of admitted communications.

BACKGROUND OF THE INVENTION

FIG. 1 depicts an asynchronous transfer mode (ATM) communications network 10. The invention is illustrated herein for a broadband integrated service digital network 10 (B-ISDN) although the invention is equally applicable to other kinds of ATM capable communications networks 10 such as synchronous optical networks (SONET). Furthermore, the model of a telephone network is used to illustrate the invention although the invention is also applicable to cable television networks, computer data networks, etc. The communications network 10 has plural nodes n1, n2, n3, n4, n5, n6, n7, n8, n9, n10, n11 and n12 which are interconnected by communication links. The communication links may include unshielded twisted pairs of wires, coaxial cables, optical fibers, satellite transponders, switches, etc. In the communications network 10, the nodes n1, n2, n3, n4, n5 and n6 are terminal equipments or TE's. For example, the TE's are customer premises equipments or CPE's such as telephones, set top boxes, cable television head ends or host computers. The nodes n7 and n8 are network termination units or NT's. The nodes n9, n10, n11 and n12 are, for example, central office switches which include ATM switches.

Communication is achieved on the communication network 10 by transmitting a bitstream on the links. The bitstream is organized into fixed length time slots. Each node that desires to communicate writes fixed length packets called "cells" into the timeslots. FIG. 2 depicts an illustrative cell 20. The cell 20 has a header portion 22 into which the node writes overhead control information and a payload portion 24 into which the node writes a message to be conveyed. The node which desires to transmit a cell writes the cell thus generated into a particular time slot of the bitstream transmitted on a selected outgoing link.

According to ATM, communication is achieved by transmitting cells that contain messages along a sequence of nodes of the communications network 10. Specifically, the cells are transmitted via a sequence of individual connections between pairs of nodes of the communications network. See M. DE PRYKER, ASYNCHRONOUS TRANSFER MODE SOLUTION FOR BROADBAND ISDN, 2d ed., ch. 2.4.5.4, p. 84–87 (1995). This sequence of connections is illustratively predefined during a set up procedure when the communication is initiated. For example, to enable communication between the node n1 and the node n4, the following sequence of connections between nodes may be set up from the node n1 to the node n4 as follows:

node n1→node n7→node n9→node n10→node n11→node n8→node n4

Likewise, a return sequence of connections between nodes may be set up from the node n4 to the node n1 as follows:

node n4→node n8→node n11→node n12→node n10→node n9→node n7→node n1.

The node n1 or n4 which generates cells for transmission is referred to as a source node. The node n4 or n1 which is the ultimate intended recipient of the cells is referred to as the destination node. Each other node n7, n9, n10, n11, n8 or n12 is an intermediate node.

A virtual channel (VC) is defined as a communication channel dynamically allocated by a node for transmitting cells of a particular connection to a second device. The collection of all VC's of a sequence of connections is referred to as a virtual channel connection (VCC). In setting up a sequence of connections, a VCC identifier is assigned to the communication. Each node (e.g., the node n8) in the sequence of nodes (e.g., n1, n7, n9, n10, n11, n8, n4) allocates a virtual channel for conveying cells to the next node in the sequence of nodes for the communication (e.g., the node n4). Each node of the sequence of nodes creates an entry in a routing table for each communication. Each entry is indexed by the VCC identifier of the respective communication and contains information regarding how to transmit received (or newly generated) cells to the next node of the sequence of nodes. For instance, the indexed routing table entry may contain an indication of the virtual channel for routing the cell, such as a virtual channel identifier (VCI).

Once the sequence of connections is set up, the source node (e.g., n1) generates one or more cells 20. The source node n1 writes the VCC identifier assigned to the communication in the cell header 22 and messages to be conveyed to the destination node (e.g., n4) in the cell payload 24. The node n1 then writes the generated cells 20 into particular timeslots of an outgoing bitstream transmitted to the next node (e.g., node n7) of the sequence of nodes for that communication. Each intermediate node (e.g., the node n7) which receives the cell 20, utilizes the VCC identifier stored in the cell to access a routing table thereat. The intermediate node (e.g., the node n7) utilizes the retrieved routing table entry (specifically, the VCI of the retrieved routing table entry) to transmit the cell on the appropriate VC to the next node (e.g., node n9) of the sequence of nodes. This process is repeated at each intermediate node (e.g., n9, n10, n11 and n8) until the cell arrives at the destination node n4.

Note also that the ATM protocol permits two nodes to set up semi-permanent connections for conveying multiple simultaneous VCC's between the nodes. Such semi-permanent connections are referred to as virtual paths (VP's). VP's are illustratively also designated in each cell header by a respective virtual path identifier (VPI).

In transmitting cells on VC's, each node writes a cell into a timeslot of an outgoing bitstream destined to another node, which timeslot is allocated for the VC. Likewise, each node selectively reads cells from timeslots of received incoming bitstreams and performs the same writing operation to other outgoing bitstreams. This form of adding and dropping of cells from different bitstreams is referred to cell layer multiplexing.

According to ATM, the number of timeslots of specific outgoing bitstreams allocated to carrying cells of each VC varies over time depending on the instantaneous traffic load at that moment at the node. Illustratively, the bandwidth, i.e., bitrate, of each outgoing bitstream is a finite amount such as 155 mbits/sec. In the event that too much traffic, i.e., too many cells are to be transmitted in an outgoing bitstream, than can be accommodated at that moment, congestion is said to occur. In the event of congestion at a node, the node may discard excess cells. Discarded cells may be retransmitted from the source node upon determination that the cells were discarded. Since congestion tends to be a spontaneous and short duration event, the discarding of cells tends to reduce the traffic load (number of cells to be transmitted in a given bitstream at one time) and alleviate the congestion. Consider that some source nodes produce cells at a constant rate while other produce cells at a variable rate which exhibits a mean bitrate and a peak bitrate. Furthermore, the arrival of cells from each source node is somewhat randomly distributed over time. Therefore, congestion is alleviated in spite of the fact that discarded cells are retransmitted from the source node.

When cells are discarded, a delay is introduced in the delivery of those cells. This poses a problem in the communication system 10. Consider that cells may contain messages for different types of communications. In some communications, the cells may contain general transactional data. Such cells are generally not time sensitive; a delay in transmitting cells does not degrade the communication. On the other hand, in other communications, the cells may contain video, audio or interactive communication information. Such cells are very time sensitive. Delayed video or audio data bearing cells can cause audio and video decoders to underflow, resulting in psycho-audially or psycho-visually perceptible discontinuities in the audio or video. Such discontinuities are at best annoying and at worst render the audio or video unintelligible. Delays in interactive data bearing cells can produce echoes if there is a cross-coupling between both directions of the communication. Alternatively, the delays may require that the participants on each end of the communication wait perceptibly long periods before receiving a response to their messages. This degrades the interactive communication since neither echoes nor perceptible delays occur in an ordinary interactive conversation.

Each communication may be associated with a quality of service or (QoS) requirement. QoS may be expressed in terms of different maximum communication tolerances such as cell transfer delay, delay jitter, cell loss ratio and/or burst cell losses. Generally speaking, interactive, audio and video data bearing cells have more strict QoS requirements than transactional computer data. Nodes may use the QoS of each communication as a basis for avoiding congestion. However, the occurrence of congestion and the prediction of traffic loads in general is a non-linear function.

The prior art has suggested several methods for controlling congestion and admission (described below) in an ATM communications network. See R. Guèrin, H. Ahamadi & M. Nagahshineh, *Equivalent Capacity and Its Application to Bandwidth Allocation in High-Speed Networks*, IEEE J. SELECT. AREAS COMM., vol. 9, no. 7, p. 968–81, September, 1991; S. Q. Li & S. Chong, *Fundamental Limits of Input Rate Control in High Speed Network*, PROC. INFOCOM'93, p. 662–71 (1993); A. Hiramatsu, *ATM Communications Network Control by Neural Networks*, IEEE TRANS. NEURAL NETWORKS, vol. 1, no. 1, p. 122–20, March, 1990; T. Ndousse, *Fuzzy Neural Control of Voice Cells in ATM Networks*, IEEE J. SELECT. AREAS COMM., vol. 12, no. 9. December, 1994; A. Bonde & S. Ghosh, *A Comparative Study of Fuzzy Versus "Fixed" Thresholds for Robust Queue Management in Cell-Switching Networks*, IEEE TRANS. NETWORKING, vol. 2, no. 4, August, 1994; U.S. Pat. No. 5,341336; and U.S. Pat. No. 5,179,556. The traffic control strategies can be categorized into two categories, namely, admission control and congestion control. The admission control strategies determine whether or not a particular node should establish a VC for a new communication based on whether or not the additional cells produced by the new communication are likely to cause congestion. The congestion control strategies adjust the production of cells for each communication for which a VC has already been established by a particular node in an attempt to reduce the traffic load at the node and thereby avert the occurrence of congestion.

The Guèrin reference proposes an "equivalent capacity method" for determining whether or not to admit a new communication to (accommodate the communication by allocating a VC during set up at) a node. The node receives the mean bit rate, the peak bit rate, the peak bit rate duration and a QoS requirement for the new communication. Using these parameters, the node simulates a multimedia traffic source through a linear mathematical analysis in order to determine the bandwidth that the node must provide in order to accommodate the new communication. The disadvantage of this method is that the linear mathematical analysis is complicated requiring the use of approximations in order to perform the requisite calculations in real time. Furthermore, in order to guarantee the QoS requirement of the new communication, the node must overestimate the equivalent capacity needed by the new communication. Based on simulation analysis, this method results in a low utilization of system resources. That is, far too many communications are refused admission to each node resulting in under-utilization of the bandwidth of each outgoing bitstream at each node.

The Hiramatsu reference proposes to use a neural network to "learn" the relationship between the QoS which can be delivered by the network and the communication parameters observed at the node (e.g., cell arrival rate, cell loss rate, etc.) and specified by the new communication (e.g., average bitrate, bitrate fluctuation, etc.). Based on the learned relationship, a node can determine whether or not to admit a new communication. There are several problems with this technique. First, the number of neural nodes is closely related to the complexity of the decision function evaluated in determining the QoS to communication parameter relationship. Currently, there is no well-defined and comprehensive model which can be used as a frame of reference in designing the decision function. Second, the decision function that the neural network "learns" is relevant to only a particular kind of traffic. If there is any traffic change in the network, the neural network must be retrained to the new network conditions, possibly requiring the addition of neural nodes.

The Li reference proposes a two-threshold congestion control method. Each node which transmits cells to another node is presumed to operate according to a "leaky-bucket" mechanism 30, such as shown in FIG. 3. Cells which are to be transmitted are stored in a queue 32. A gate 34 controls the transfer of cells from the head of the queue 32 to the tail of an output queue 38 in response to a token pool 36. If a token is available in the token pool 36, and a cell is available for output at the head of the queue 32, the gate 34 transfers the cell from the queue 32 to the queue 38 and deletes the token in the token pool 36. Cells are then outputted to a recipient node from the output queue 38. Tokens are replenished to the pool 36 on a constant time basis. The leaky bucket 30 effectively allows a node to "borrow" from the bandwidth of the recipient node. According to the Li reference, two types of tokens are provided. Initially, only tokens of the first type are used to transfer cells to the output queue 38. When the first type of tokens are completely depleted, tokens of the second type are then used to transfer cells to the output queue 38. In the event too many cells are received than total tokens of the first and second type (and which can be buffered in the queue 32), the excess cells are discarded. In the event congestion occurs at the recipient node, then cells corresponding to tokens of the second type are discarded to avert congestion. The total number of cells of the first type correspond to a first threshold of cells which are not discarded in the event of congestion. The total number of cells of the second type correspond to a second threshold. The cells corresponding to the second type of tokens (produced beyond the first threshold, but below the second threshold) might be discarded in the event of congestion. Those cells produced beyond the second threshold are automatically discarded to avert congestion. The problem with this method is that it is difficult to acquire complete statistics on the occurrence of congestion in a communications network. Therefore, it is difficult to establish the two thresholds. Furthermore, the rationale for establishing the two thresholds is unclear.

U.S. Pat. No. 5,179,556 proposes a traffic control mechanism directed to prioritizing cells for selected transmission depending on whether or not the cells are part of a burst. A source of cells "encodes" the cells to indicate whether the cells are at the start, middle or end of a train of cells in a burst. Lone cells not part of a burst are not encoded. Each node has a state machine associated with each outgoing link. The state machine determines whether or not to block or transmit received cells. (The state machines can only have two states: block or transmit). The state machine decodes each encoded cell and uses the burst codes as a basis for permitting a transition from one state to another. That is, a state machine can transition from the blocking state to the transmit state, or vice versa, only at the beginning or end of a burst, not in the middle of a burst. This patent also proposes a connection admission mechanism which uses a single threshold to determine whether or not to admit a new communication to a node. The problem with this patent is that traffic loads are difficult to predict thus making it difficult to establish appropriate criterion (i.e., thresholds) for determining when to transition from a transmit state to a blocking state or when there is available capacity to support new communications at a node.

U.S. Pat. No. 5,341,366, the Bonde reference and the Ndousse reference propose to use fuzzy logic and fuzzy set theory in either congestion or admission control. Fuzzy logic and fuzzy sets can best be explained in comparison to ordinary logic and sets. In ordinary logic, each constant and logical predicate may have only one of two values, namely, true or false (or 0 or 1). In fuzzy logic, each constant and predicate may have a whole continuum of values between true and false or 0 or 1. These values represent a possibility between 0 and 1 that the corresponding fuzzy logic constant or predicate is true. Likewise, in ordinary set theory, a predicate function can be defined over a group of set elements which determines whether or not a set element is contained in a given set with absolute certainty. For instance, consider the set of positive integers. A predicate $L(x)$ can be defined over the entire set of integers such that $L(x)=1$ (true) for $x>0$ and $L(x)=0$ (false) for $x\leq 0$. For fuzzy sets, a fuzzy logic predicate can be defined which indicates the possibility between 0 and 1 that an element is a member of the set. A mathematical expression which converts values to such possibilities is referred to as a membership function. Consider the set of tall people. A membership function, denoted $\mu_{tall}(x)$, may be defined such that $\mu_{tall}(x)=0$ for $x\leq 1.9$ meters, $\mu_{tall}(x)=10x-19$ for 1.9 meters$<x\leq 2$ meters, and $\mu_{tall}(x)=1$ for $x>2$ meters. Membership functions can be continuous as shown in the above example or can be discrete with plural quantum levels.

The following formalism is defined for fuzzy logic and fuzzy sets as used herein. Define a linguistic variable as a variable which is defined over a given range of values, called a universe of discourse. A linguistic variable is also associated with a set of terms wherein each term is a fuzzy set. For example, consider a linguistic variable v which is a measure of buffer occupancy from 0 to some constant $V_c$. Suppose the term set $T(v)$ of the linguistic variable v includes the terms {Low, Medium and High}. A membership function exists which determines the possibility that a given value of v in the universe of discourse between 0 and $V_c$ is a member of the fuzzy set Low. Likewise, membership functions are defined for the fuzzy sets Medium and High. For example, as shown in FIG. 4, the membership function of the set Low, denoted $\mu_{Low}(v)$, is a sigmoid function. The membership function for the set Medium, denoted $\mu_{Medium}(v)$ is a triangle function $f(v; V_c/2, V_c/2, V_c/2)$ wherein $f(x;x_0,a_0,a_1)$ is given by:

$$f(x;x_0,a_0,a_1) = \begin{cases} \dfrac{x-x_0}{a_0}+1 & x_0-a_0 < x \leq x_0 \\ \dfrac{x_0-x}{a_1}+1 & x_0 < x \leq x_0+a_1 \\ 0 & \text{otherwise} \end{cases}$$

The membership function for the set High, denoted $\mu_{High}(v)$ is a trapezoid function $g(v;3V_c/4,V_c,V_c/4,O)$ wherein $g(x;x_0,x_1,a_0,a_1)$ is given by:

$$g(x;x_0,x_1,a_0,a_1) = \begin{cases} \dfrac{x-x_0}{a_0}+1 & x_0-a_0 < x \leq x_0 \\ 1 & x_0 < x \leq x_1 \\ \dfrac{x_1-x}{a_1}+1 & x_1 < x \leq x_1+a_1 \\ 0 & \text{otherwise} \end{cases}$$

Consider the value $v=V_c/2$. The membership of $v=V_c/2$ in the term sets Low, Medium and High is as follows: $\mu_{Low}(v=V_c/2)=0.5$, $\mu_{Medium}(v=V_c/2)=1$ and $\mu_{High}(v=V_c/2)=0$. Given these possibilities of the membership of $v=V_c/2$ in each of the term sets, a number of fuzzy logic rules may be defined (as described below) for controlling admission or traffic regulation.

According to the above references, a fuzzy mechanism 40 such as is shown in FIG. 5 is used in congestion control and admission control. A communication parameter X is inputted to a fuzzifier circuit 42 which may be a general purpose processor. The fuzzifier circuit 42 executes one or more appropriate membership functions (as described below) to convert the inputted parameter to one or more possibilities. An inference engine 44 (general purpose processor or special purpose fuzzy processor) executes fuzzy logic rules of a fuzzy logic rule base 46 (a memory which stores fuzzy logic rules) on the possibilities. A fuzzy logic rule is in the form of a predicate $R_0$:

$$R_0: \text{If } P_1=P_{1,c} \text{ then } P_2=P_{2,c}$$

where $P_1$ and $P_2$ are input and output linguistic variables, respectively. $P_{1,c}$ and $P_{2,c}$ are particular terms of $P_1$ and $P_2$, respectively. For instance, $P_{1,c}$ can be the inputted parameter X and $P_{2,c}$ can be a predetermined constant which is representative of the term $P_2$. According to fuzzy set theory, there are several ways to evaluate such fuzzy logic predicates. For instance, in evaluating $R_0$, the possibility that $P_2$ equals $P_{2,c}$ can be set equal to the possibility that $P_1$ equals $P_{1,c}$. In the case that $P_1$ is a composite possibility such as $P_1=P_3 \wedge P_4 \wedge \ldots$ or $P_1=P_5 \vee P_6 \vee \ldots$ the following rules of composition are applied. For logical AND, i.e., $P_1=P_3 \wedge P_4$, $P_1$ is the minimum of the possibilities of $P_3$ and $P_4$. For logical OR, i.e., $P_1=P_5 \vee P_6$, $P_1$ is the maximum of the possibilities of $P_5$ and $P_6$. It is possible that more than one fuzzy rule determines the possibility that the fuzzy predicate $P_2$ is a particular term $P_{2,c1}$. For instance, consider the following fuzzy logic rules:

$R_1$:If $P_1=P_{1,c}$ then $P_2=P_{2,c1}$ $R_2$:If $P_1=P_{2,c}$ then $P_2=P_{2,c2}$ $R_3$:If $P_1=P_{3,c}$ then $P_2=P_{2,c1}$ In this case, both rules $R_1$ and $R_3$ determine a possibility that $P_2=P_{2,c1}$ is implicated. In such a case, the possibility of $R_1$ and $R_3$ are computed as described above. The possibility that $P_2=P_{2,c1}$ is implicated by either rule is simply the maximum of the possibilities of the rules $R_1$ and $R_3$.

The possibilities of the rules thus determined by the inference engine 44 are then outputted to a defuzzifier circuit 48 which may be a general purpose processor. The defuzzifier circuit 48 converts the possibilities to a "crisp" output Y. Again, several different strategies may be used. Illustratively, the crisp output simply be a weighted average of each term of the output linguistic variable. The weight of each term is simply the possibility of the corresponding rule determined as described above. In each case of multiple rules with the same resultant predicate (i.e., rules $R_1$ and $R_3$), the maximum of the possibilities of the rules is used as the weight for the corresponding term of the output linguistic variable.

The references Ndouse, Bonde and U.S. Pat. No. 5,341,366 use fuzzy logic to control congestion or admission in a communications network. Ndouse uses fuzzy logic in the above-noted leaky bucket mechanism to adjust the thresholds at which selective discarding of cells occurs at a node to control the traffic load. Bonde also uses fuzzy logic to control the selective discarding of cells to adjust the traffic load at a node. Bonde uses fuzzy logic to determine the fraction of cells to discard based on the occupancy of the input cell queue of a node. U.S. Pat. No. 5,341,266 uses fuzzy logic to control the admission of new communications at a node. However, none of the fuzzy logic traffic control schemes control both the admission of a communication to a node and the adjustment of the number of cell produced for each communication.

It is therefore an object of the present invention to provide a fuzzy logic traffic control process and system which controls both the admission of communications at a node and the number of cells transmitted to a node.

SUMMARY OF THE INVENTION

This and other objects are achieved by the present invention. The environment of the present invention is a communications network comprising a plurality of interconnected nodes. Each of the nodes communicate with each other by transmitting a bitstream to one another via links, which bitstream is organized into fixed length timeslots. Communication is achieved according to the ATM protocol whereby the nodes selectively read fixed length cells from, and write fixed length cells into, the fixed length timeslots of the bitstream. Source nodes may transmit cells at a fixed bandwidth or a variable bandwidth. Associated with the cells of each communication is a QoS requirement. Each node may have plural queues including one queue for each QoS requirement.

According to an embodiment, each node has a fuzzy traffic controller for controlling admission of new communications to the node and for adjusting the rate at which each other node transmits cells to the node (for insertion in the plural queues) for each communication already admitted. The fuzzy traffic controller uses a fuzzy rule base and a fuzzy logic inference engine to control the admission of new communications to the node and to adjust the transmission rate of cells of communications already admitted to that node. The fuzzy traffic controller has a fuzzy bandwidth calculator, a fuzzy admission controller and a fuzzy congestion controller. Illustratively, a system parameters calculator may be provided for determining traffic load parameters such as queue occupancy q, rate of variance of queue occupancy $\Delta q$ and cell loss probability $p_l$ of a given queue associated with a particular $Q_0S$. These parameters are received at the fuzzy congestion controller. The fuzzy congestion controller "fuzzifies" these parameters, i.e., converts them to fuzzy values through predefined membership functions, and evaluates a set of predetermined fuzzy rules on the "fuzzified" parameters. In evaluating the fuzzy logic rules, the fuzzy congestion controller determines a traffic load adjustment parameter y. The fuzzy congestion controller "defuzzifies" the traffic load adjustment parameter y, i.e., converts the traffic load adjustment parameter y to a "crisp" value through use of a predefined conversion formula. The fuzzy traffic controller uses the crisp traffic load adjustment parameter y to output a signal to each node that supplies cells to the node containing the fuzzy traffic controller for adjusting the cell transmission rate (i.e., blocking/ unblocking or controlling the level of cell production) for each communication.

The fuzzy bandwidth calculator receives parameters from each other node requesting admission of its communication to the node containing the fuzzy traffic controller. These parameters illustratively are the mean bandwidth $R_m$, the peak bandwidth $R_p$ and burst duration $T_p$ of the new communication. Illustratively, the request also specifies a QoS which can be associated with a specific output queue of the node containing the fuzzy traffic controller. The fuzzy bandwidth calculator "fuzzifies" these parameters and evaluates a set of predetermined fuzzy logic rules on the fuzzified parameters. In evaluating the predetermined fuzzy logic rules, the fuzzy bandwidth calculator determines a bandwidth capacity requirement parameter $C_e$. The fuzzy bandwidth calculator "defuzzifies" the bandwidth capacity requirement parameter $C_e$. Illustratively, a network resource manager may be provided which receives the crisp bandwidth capacity requirement parameter $C_e$ and determines therefrom an available bandwidth capacity parameter $C_a$. For instance, the network resource manager may use a table to keep track of the information (i.e. VPI, VCI, bandwidth capacity requirement $C_e$, etc.) needed for each accepted new communication. The fuzzy admission controller receives the available bandwidth capacity parameter $C_a$, the traffic adjustment parameter y for the queue, which is determined by the fuzzy congestion controller, and the loss probability $p_l$ (of the queue which will receive the cells of the new communication), for example, from the system parameters calculator. The fuzzy admission controller "fuzzifies" theses received parameters and evaluates a set of predetermined logic rules thereon. In evaluating the fuzzy logic rules, the fuzzy admission controller determines an admission request decision signal z. The fuzzy admission controller "defuzzifies" the admission request decision signal z and outputs the crisp decision signal z to the node which requested admission of the communication.

Illustratively, a process for fuzzy congestion control, and a process for fuzzy communication admission control, are provided which are executed by the fuzzy logic controller. An equivalent capacity model is illustratively used to develop a set of fuzzy logic rules for estimating the bandwidth capacity requirement for a new communication requesting admission to the node. The set of fuzzy logic rules which determine whether or not to admit a new communication to a node are developed from a QoS requirement standpoint; the bandwidth capacity requirement, existence of congestion and cell loss probability are used as a basis for deciding whether or not to admit a new communication. A two-threshold congestion control method is illustratively used to develop a set of fuzzy logic rules for determining a parameter for adjusting the number of cells produced for input to the node. In each process, parameters are received and fuzzy logic rules are evaluated on the parameters to determine an output parameter. Illustratively, the membership functions of each rule are triangular or trapezoidal functions.

Illustratively, the set of rules for determining a traffic load adjustment parameter y for a specific output queue are developed from the term sets $T(q)=\{E,F\}$, $T(\Delta q)=\{N,P\}$, $T(p_l)=\{S,NS\}$ and $T(y)=\{IM, IS, DS, NC\}$ where:

q is the queue occupancy of a specific output queue of the node, $\Delta q$ is the variance rate of the queue occupancy of the specific output queue, $p_l$ is the cell loss probability of the specific output queue, y is the traffic load adjustment parameter for the specific output queue, E means empty queue occupancy, F means full queue occupancy, N means negative growth in queue occupancy rate, P means positive growth in queue occupancy rate, S means satisfactory cell loss rate, NS means unsatisfactory cell loss rate, IM means increase traffic load of specific output queue much, IS means increase traffic load of specific output queue somewhat, DS means decrease traffic load of specific output queue somewhat, and NC means no change in traffic load of specific output queue.

The rules are as follows:

| Rule | q | $\Delta q$ | $p_l$ | y |
|---|---|---|---|---|
| 1 | E | N | S | IM |
| 2 | E | N | NS | IM |
| 3 | E | P | S | IS |
| 4 | E | P | NS | IM |
| 5 | F | N | S | IM |
| 6 | F | N | NS | IM |
| 7 | F | P | S | DS |
| 8 | F | P | NS | NC |

The set of rules for determining the bandwidth capacity requirement $C_e$ of an incoming request to admit a new communication to the network are determined from the term sets $T(R_p)=\{S, M, L\}$, $T(R_m)=\{Lo, Hi\}$, $T(T_p)=\{Sh, Me, Lg\}$ and $T(C_e)=\{C_1, C_2, C_3, C_4, C_5, C_6\}$ where:

$R_p$ is a peak bandwidth of the new communication requesting admission, $R_m$ is a mean bandwidth of the new communication requesting admission, $T_p$ is a peak bandwidth burst duration of the new communication requesting admission, $C_e$ is the bandwidth capacity requirement of the new communication requesting admission, S means a small peak bandwidth, M means a medium peak bandwidth, L means a large peak bandwidth, Lo means a low mean bandwidth, Hi means a high mean bandwidth, Sh means a short peak bandwidth burst period, Me means a medium peak bandwidth burst period, Lg means a long peak bandwidth burst period, $C_1$ means a first bandwidth capacity level, $C_2$ means a second bandwidth capacity level, $C_3$ means a third bandwidth capacity level, $C_4$ means a fourth bandwidth capacity level, $C_5$ means a fifth bandwidth capacity level, and $C_6$ means a sixth bandwidth capacity level.

The fuzzy logic rules are:

| Rule | $R_p$ | $R_m$ | $T_p$ | $C_e$ |
|---|---|---|---|---|
| 1 | S | Lo | Sh | $C_1$ |
| 2 | S | Lo | Me | $C_2$ |
| 3 | S | Lo | Lg | $C_5$ |
| 4 | S | Hi | Sh | $C_1$ |
| 5 | S | Hi | Me | $C_1$ |
| 6 | S | Hi | Lg | $C_4$ |
| 7 | M | Lo | Sh | $C_1$ |
| 8 | M | Lo | Me | $C_3$ |
| 9 | M | Lo | Lg | $C_6$ |
| 10 | M | Hi | Sh | $C_1$ |
| 11 | M | Hi | Me | $C_2$ |
| 12 | M | Hi | Lg | $C_5$ |
| 13 | L | Lo | Sh | $C_4$ |
| 14 | L | Lo | Me | $C_6$ |
| 15 | L | Lo | Lg | $C_6$ |
| 16 | L | Hi | Sh | $C_3$ |
| 17 | L | Hi | Me | $C_5$ |
| 18 | L | Hi | Lg | $C_6$ |

The set of rules for determining the decision signal z, which indicates whether or not to accept an incoming request to admit a new communication (and to accept the cells thereof in a respective output queue), are determined from the term sets $T(C_a)=\{NE, E\}$, $T(y)=\{N, P\}$, $T(p_l)=\{S, NS\}$ and $T(z)=\{R, WR, WA, A\}$ where $C_a$ is an available bandwidth capacity (determined from the bandwidth capacity requirement $C_e$), z is the decision signal which indicates whether or not to accept the request to admit the new communication, NE means not enough capacity for new communications, E means enough capacity for new communications, N means traffic load condition is congested, P means traffic load condition is not congested, S means satisfactory cell loss rate in the respective output queue, NS means unsatisfactory cell loss rate in the respective output queue, R means reject request to admit the new communication, WR means weakly reject request to admit the new communication, WA means weakly accept request to admit the new communication, and A means accept request to admit the new communication.

The fuzzy logic rules are:

| Rule | $p_l$ | y | $C_a$ | z |
|---|---|---|---|---|
| 1 | S | N | NE | WR |
| 2 | S | N | E | WA |
| 3 | S | P | NE | WA |
| 4 | S | P | E | A |
| 5 | NS | N | NE | R |
| 6 | NS | N | E | R |
| 7 | NS | P | NE | R |
| 8 | NS | P | E | WR |

In short, a process and system are provided for controlling traffic in a node of an ATM communications network. Fuzzy logic is used in the traffic control process and system to avert congestion in admitting new communications and in receiving cells from communications already admitted to the node. The process and system according to the invention are practical to implement and also provide an improvement over conventional traffic control.

DETAILED DESCRIPTION OF THE INVENTION

Figure 1:
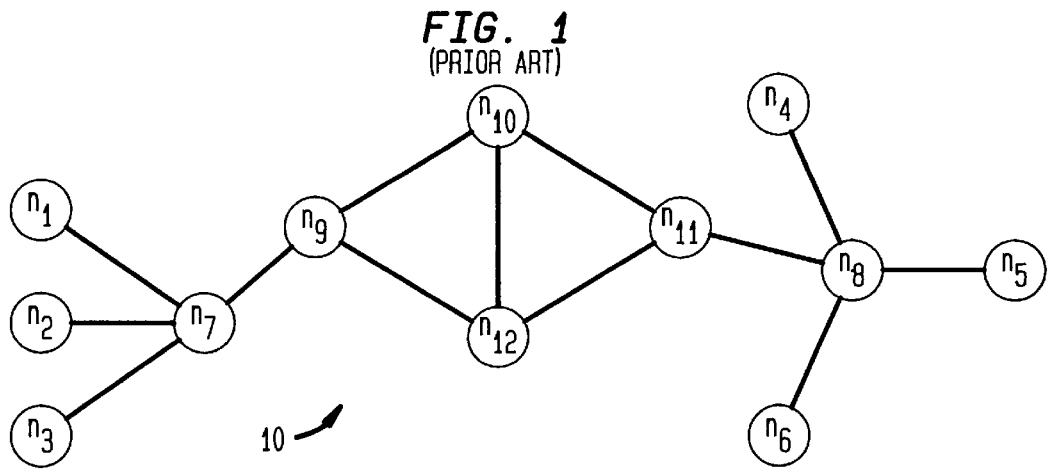
FIG. 1 shows a conventional ATM communications network.
Figure 2:
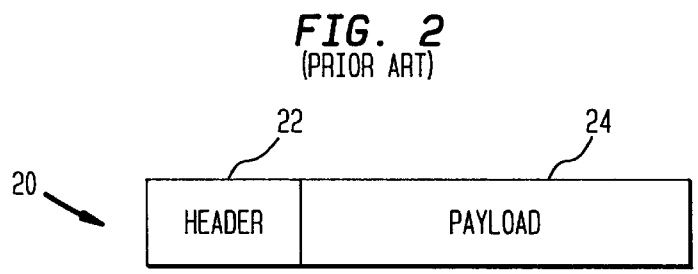
FIG. 2 shows a conventional cell.
Figure 3:
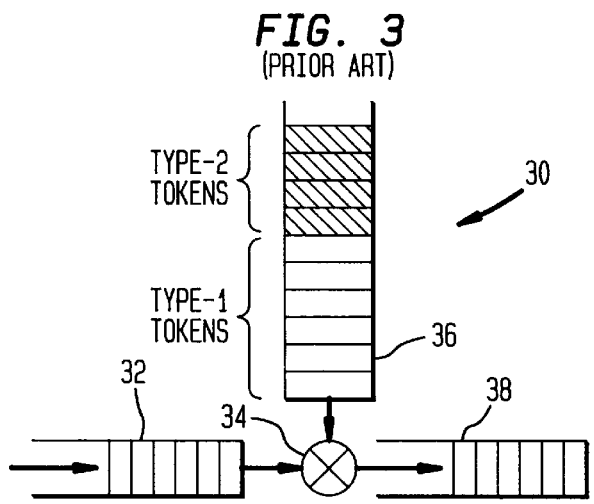
FIG. 3 shows a conventional leaky bucket transmission control mechanism.
Figure 4:
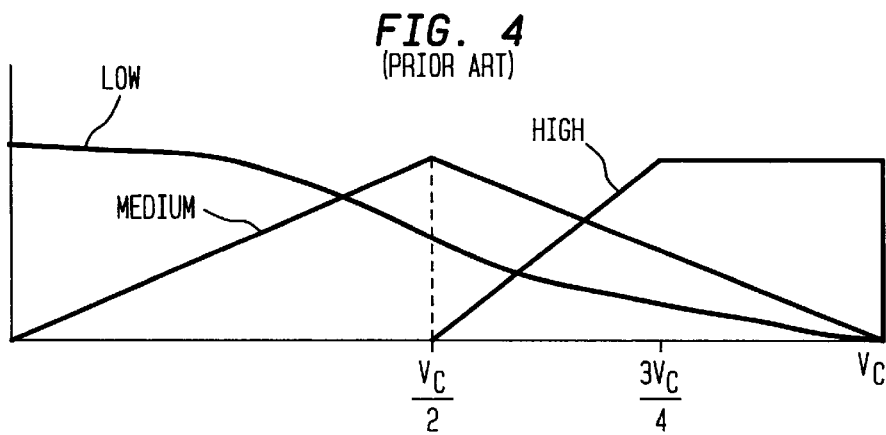
FIG. 4 shows conventional membership functions.
Figure 6:
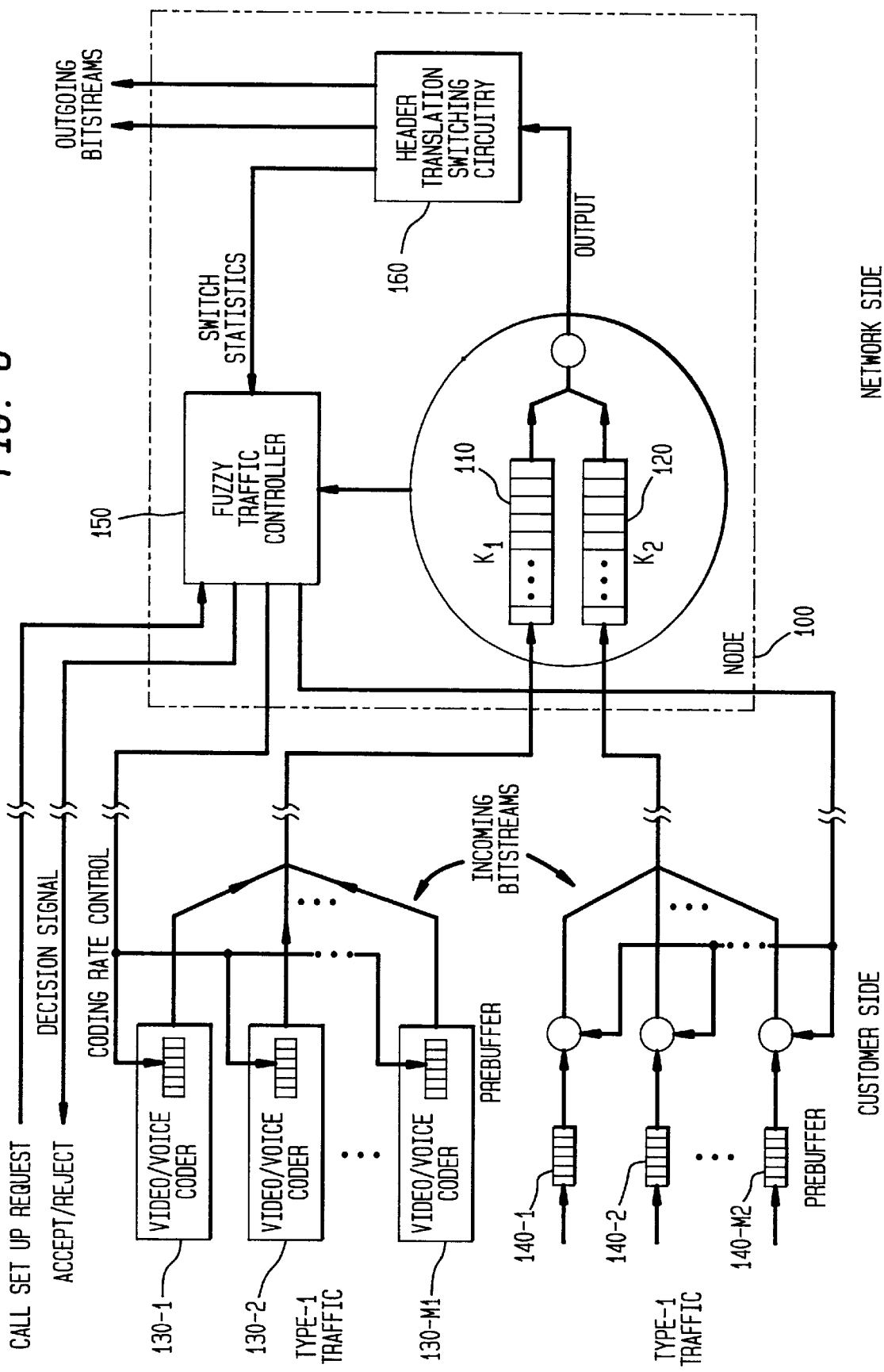
FIG. 6 shows a node according to an embodiment of the present invention.

FIG. 6 depicts a node 100 according to an embodiment of the present invention. Illustratively, the node 100 is an NT, although the node 100 can be any node in an ATM communications network (such as the communications network 10 shown in FIG. 1). Illustratively, the node 100 includes plural output queues 110 and 120. Each queue 110, 120 is for storing cells received from incoming bitstreams for later transmission on one or more outgoing bitstreams. Illustratively, one queue is provided for each different type of QoS accommodated by the node. In FIG. 6, the QoS's are broadly grouped into delay sensitive (such as audio, video or interactive data bearing cells) and delay insensitive (such as transactional data bearing cells). However, this is merely for purposes of illustration. The QoS's may be partitioned into different numbers of queues. As shown plural cell sources 130-1, 130-2, . . . , 130-M1 and 140-1, 140-2, . . . , 140-M2 are provided, which may be TE nodes. The cell sources 130-1, 130-2, . . . , 130-M1 are nodes which produce delay sensitive cells. The cell sources 140-1, 140-2, . . . , 140-M2 are nodes which produce delay insensitive cells. When cells are received from the sources 130-1, 130-2, . . . , 130-M1, they are temporarily enqueued into the output queue 110. Likewise, cells received from the sources 140-1, 140-2, . . . , 140-M2 are enqueued into the output queue 120. The queued cells are read out of the respective queues 110, 120 periodically and written into appropriate timeslots of outgoing bitstreams. The queue 110 illustratively has a maximum occupancy of $K_1$ cells and the queue 120 illustratively has a maximum occupancy of $K_2$ cells.

The node 100 has a fuzzy traffic controller 150. The fuzzy controller 150 receives requests from cell sources during communication set up to admit new communications to the node 100 (i.e., to allocate a VC for receiving cells for the new communications). In response, the fuzzy traffic controller 150 transmits a decision signal to the cell source that issued the request, which decision signal either rejects or accepts the request. In addition, the fuzzy traffic controller 150 periodically monitors the traffic load at the node 100. Based on this monitoring, the fuzzy traffic controller 150 averts congestion by outputting traffic load adjustment signals to the cell sources 130-1, 130-2, . . . , 130-M1, 140-1, 140-2, . . . , 140-M2. The cell sources 130-1, 130-2, . . . , 130-M1 and 140-1, 140-2, . . . , 140-M2 adjust the rate at which they deliver cells to the node 100. For instance, the sources 130-1, 130-2, . . . , 130-M1 illustratively reduce or increase the rate at which data is encoded, thereby reducing or increasing the rate at which cells are produced, depending on the traffic load adjustment signal. The sources 140-1, 140-2, . . . , 140-M2 on the other hand, illustratively stop transmitting cells entirely or restart transmitting cells depending on the traffic adjustment parameter. Stated another way, the sources 130-1, 130-2, . . . , 130-M1 can produce and deliver cells at a continuously variable rate, for instance, by adjusting the encoding process thereat. The sources 140-1, 140-2, . . . , 140-M2, on the other hand can either suspend cell production or resume cell production. Note that this type of operation is desirable; in audio, video and transactional communications it is important to continuously supply data to prevent (destination node) decoder underflow, even at the expense of data accuracy. For transactional computer data, however, data need not be continuously supplied, but should be as accurate as possible.

In addition, the node 100 includes switching circuitry and header translation circuitry 160. This circuitry 160 implements routing table look up and cell-layer multiplexing.

Figure 5:
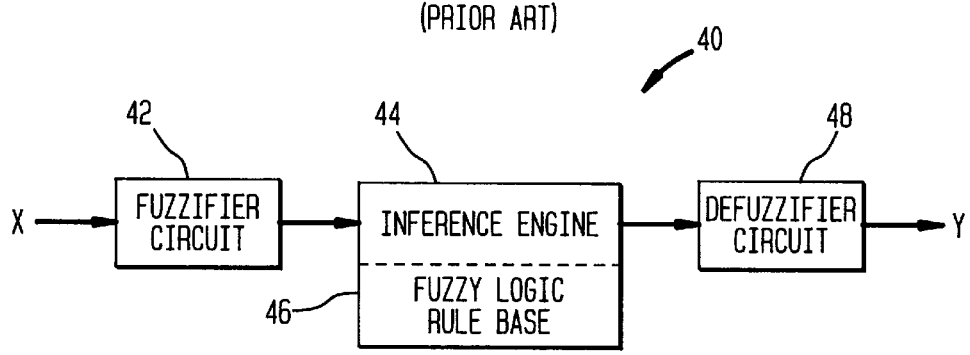
FIG. 5 shows a conventional fuzzy logic controller.
Figure 7:
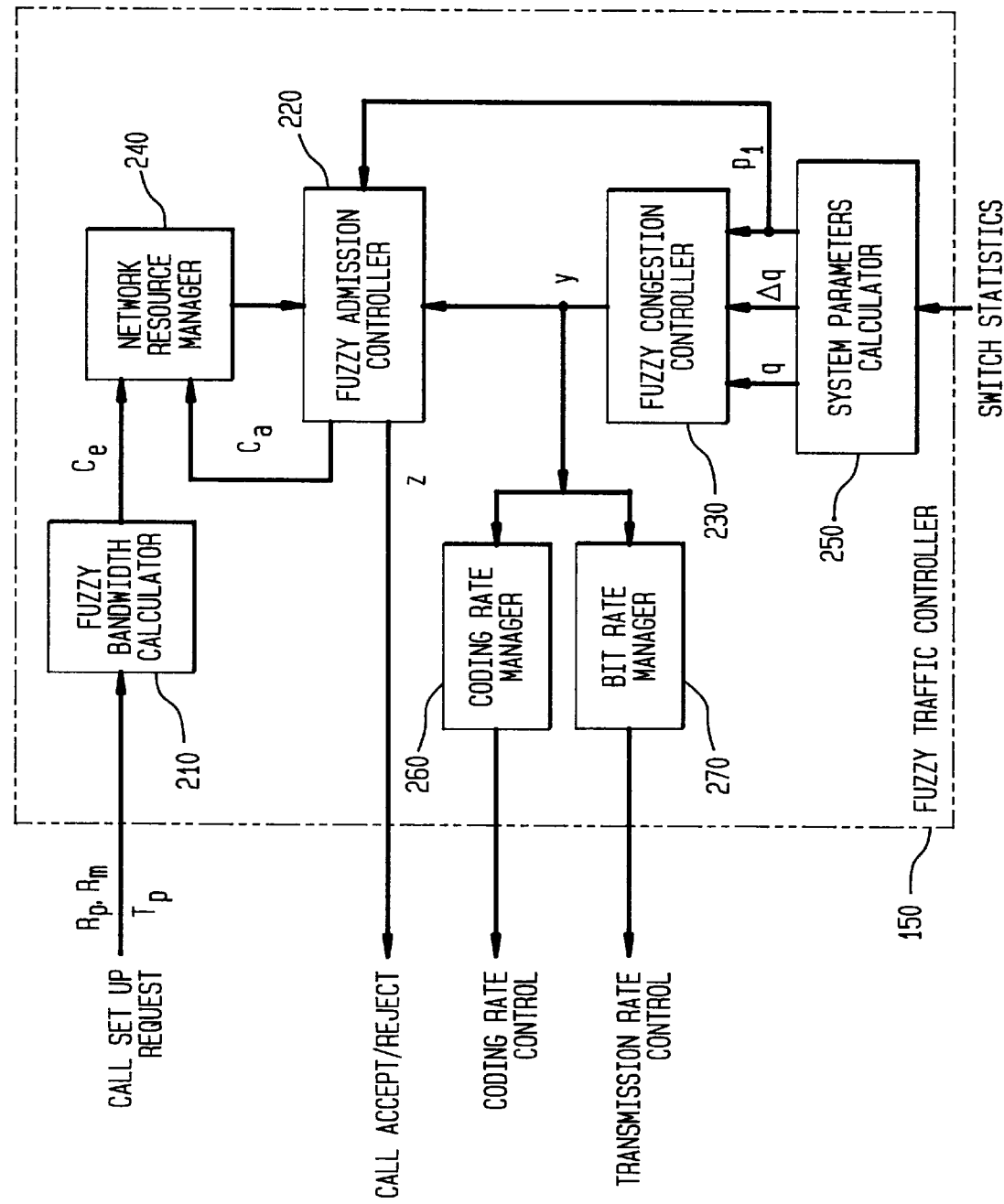
FIG. 7 shows the fuzzy logic controller of the node of FIG. 6 in greater detail.

FIG. 7 depicts the fuzzy traffic controller 150 in greater detail. As shown, the fuzzy traffic controller 150 includes three fuzzy logic control circuits, namely, a fuzzy bandwidth calculator 210, a fuzzy admission controller 220 and a fuzzy congestion controller 230. These fuzzy controllers may be implemented using the architecture depicted in FIG. 5 using general purpose processors or specialized fuzzy processors. In addition, a network resource manager circuit 240, a system parameter calculator 250, a coding rate manager circuit 260 and a transmission rate manager circuit 270 are provided. The functions of each of these circuits are briefly described as follows:

(1) The system parameter calculator 250 measures the queue occupancy q, the queue occupancy variation rate and the cell loss rate $p_l$ of each queue 110 and 120 (FIG. 6). These parameters q, $\Delta q$ and $p_l$ are outputted to the fuzzy congestion controller 230.

(2) The fuzzy congestion controller 230 receives the parameters q, $\Delta q$ and $p_l$ of a a specific queue 110 or 120 and evaluates a predetermined set of fuzzy logic rules, of a fuzzy logic congestion rule base, thereon. To that end, the fuzzy congestion controller 230 converts the parameters q, $\Delta q$ and $p_l$ to fuzzy values using predetermined membership functions of the fuzzy logic congestion rule base. The fuzzy congestion controller 230 then evaluates the fuzzy logic rules on the fuzzy parameter values to produce a fuzzy value of a traffic load adjustment parameter y. Using a predetermined formula, the fuzzy congestion controller 230 converts the fuzzy logic valued traffic load adjustment parameter y to a crisp traffic load adjustment parameter y.

(3) The fuzzy bandwidth calculator 210 receives plural parameters from a cell source which request admission of its new communication at the node 100 (FIG. 6). These parameters are the peak bandwidth $R_p$, the mean bandwidth $R_m$, and the peak bandwidth burst period $T_p$ (duration in which a train of cells are produced at the maximum cell rate of the cell source). Like the fuzzy congestion controller 230, the fuzzy bandwidth calculator 210 uses predetermined membership functions of a predetermined rule base to convert the parameters $R_p$, $R_m$ and $T_p$ to fuzzy logic values. The fuzzy bandwidth calculator 210 then evaluates the fuzzy logic rules of the rule base on the fuzzy parameters to determine fuzzy values of a bandwidth capacity requirement $C_e$ of the new communication. Using a predetermined formula, the fuzzy bandwidth calculator 210 converts the fuzzy valued bandwidth capacity requirement $C_e$ to a crisp bandwidth capacity requirement $C_e$.

(4) The network resource manager circuit 240 calculates the bandwidth capacity currently available for allocation $C_a$ according to the bandwidth capacity requirement $C_e$ estimated by the fuzzy bandwidth calculator 210. Furthermore, the network resource manager 240 incrementally records the current utilization of system bandwidth resources as a function of the bandwidth capacity requirement estimates $C_e$ of each new communication. For instance, after accepting a new communication with bandwidth capacity requirement $C_e$, the new value of $C_a$ is updated by subtracting $C_e$ from the old value of $C_a$. On the contrary, when an existing communication with bandwidth capacity requirement $C_e$ disconnects its communication, the new value of $C_a$ is updated by adding $C_e$ to the old value of $C_a$.

(5) The fuzzy admission controller 220 receives the bandwidth capacity currently available for allocation $C_a$, the traffic load adjustment y, and the cell loss rate $p_l$ parameters. Using predetermined membership functions of a fuzzy logic rule base, the fuzzy admission controller 220 converts the parameters $C_a$, y and $p_l$ to fuzzy logic values. The fuzzy admission controller 220 then evaluates the fuzzy logic rules of the fuzzy logic rule base on the fuzzy logic values of the parameters $C_a$, y and $p_l$ to determine a fuzzy valued decision parameter z. Using a predetermined formula of the fuzzy logic rule base, the fuzzy logic admission controller 220 converts the fuzzy value of the decision parameter z to a crisp decision parameter z.

(6) The coding rate manager circuit 260 receives the crisp traffic load adjustment parameter y. In response thereto, the coding rate manager circuit 260 outputs a signal to the cell sources which can produce cells at a variable rate (i.e., the sources 130-1, 130-2, . . . , 130-M1 of FIG. 6) to reduce or increase the number of cells delivered to the node 100 (FIG. 6). This can be achieved at the cell sources by selectively discarding cells of lower importance, by changing the encoding to generate cells at a different rate, or by both techniques.

(7) The bit rate manager circuit 270 receives the crisp load adjustment parameter y. In response thereto, the bit rate manager circuit 270 outputs a signal for blocking (suspending) or unblocking (resuming) the production and delivery of cells from those cell sources which cannot tolerate any data loss (e.g., the sources 140-1, 140-2, . . . , 140-M2 of FIG. 6).

Below, the fuzzy logic processing of the fuzzy bandwidth calculator 210, fuzzy admission controller 220 and fuzzy congestion controller 230 are discussed in greater detail.

In the fuzzy congestion controller 230, the two threshold model is used as a basis to derive the fuzzy logic rule base. Through simulation, the parameters of queue occupancy q, queue occupancy variance $\Delta q$ and cell loss probability $p_l$ have been discovered to provide a good basis for determining the "congestiveness" of a specific queue 110 or 120 (FIG. 6) at the node 100 (FIG. 6). In addition, the simulations reveal that the following term sets provide an optimal basis for determining traffic load adjustment: $T(q)=\{E,F\}$, $T\{\Delta q\}=\{N, P\}$, $T(p_l)=\{S, NS\}$ and $T(y)=\{DS, NC, IS, IM\}$ where:

E means empty queue occupancy of the specific queue

F means full queue occupancy of the specific queue

N means negative growth in queue occupancy rate of the specific queue

P means positive growth in queue occupancy rate of the specific queue

S means satisfactory cell loss rate of the specific queue

NS means unsatisfactory cell loss rate of the specific queue

IM means increase traffic load at node much

IS means increase traffic load at node some what

DS means decrease traffic load at node some what, and

NC means no change in traffic load at node.

The following membership functions are defined in the fuzzy logic rule base for converting the parameters to fuzzy logic values:

$$\mu_E(q)=g(q;O,E_e,O,E_w)$$

$$\mu_F(q)=g(q;F_e,K_i,F_w,O)$$

$$\mu_N(\Delta q)=g(\Delta q;-K_i,N_e,O,N_w)$$

$$\mu_P(\Delta q)=g(\Delta q;P_e,K_i,P_w,O)$$

$$\mu_S(p_l)=g(p_l;O,S_e,O,S_w)$$

$$\mu_{NS}(p_1)=g(p_l;NS_e,1,NS_w,O)$$

$$\mu_{IM}(y)=f(y;IM_c,O,O)$$

$$\mu_{IS}(y)=f(y;IS_c,O,O)$$

$$\mu_{DS}(y)=f(y;DS_c,O,O)$$

$$\mu_{NC}(y)=f(y;NC_c,O,O)$$

where $f(x;x_0,a_0,a_1)$ is a triangle function given by:

$$f(x;x_0,a_0,a_1) = \begin{cases} \frac{x-x_0}{a_0}+1 & x_0-a_0 < x \leq x_0 \\ \frac{x_0-x}{a_1}+1 & x_0 < x \leq x_0+a_1 \\ 0 & \text{otherwise} \end{cases}$$

and where $g(x;x_0,x_1,a_0,a_1)$ is a trapezoidal function given by:

$$g(x;x_0,x_1,a_0,a_1) = \begin{cases} \dfrac{x-x_0}{a_0} + 1 & x_0 - a_0 < x \leq x_0 \\ 1 & x_0 < x \leq x_1 \\ \dfrac{x_1-x}{a_1} + 1 & x_1 < x \leq x_1 + a_1 \\ 0 & \text{otherwise} \end{cases}$$

Advantageously, the constants $E_e$ and $F_e$ are set to the low and high thresholds in the two-threshold model. $E_w$ and $F_w$ are both set equal to the difference between the two thresholds $F_e - E_e$. The constant $K_i$ is set equal to the maximum queue occupancy $K_1$ when determining y for the queue 110 (FIG. 6) and $K_i$ is set equal to the maximum queue occupancy $K_2$ when determining y for the queue 120 (FIG. 6). $N_e$ is set equal to the queue occupancy variation rate during a period of congestion and $P_e$ is set equal to the queue occupancy variation rate during congestion free periods. The constants $P_w$ and $N_w$ are both set equal to the difference between the two queue occupancy variation rates $P_e$ and $N_e$ i.e., $P_w = N_w = P_e - N_e$. The constants $IM_c$ is set equal to the maximum percentage of cells that are prohibited to enter the node 100 (FIG. 6) or which may be discarded, in the event of congestion. The constant $NC_c$ is set to zero. The constant $IS_c$ is set equal to some value between $IM_c$ and $NC_c$. A small value of $IS_c$ provides greater traffic load control accuracy while a large value of $IS_c$ provides for greater adaptability to new traffic load conditions. The particular value of $IS_c$ may be selected by simulation to balance accuracy and adaptability according to the number and types of cell sources 130-1, 130-2, . . . , 130-M1, 140-1, 140-2, . . . , 140-M2 (FIG. 6) which can transmit cells to the node 100 (FIG. 6). For purposes of symmetry, $DS_c$ is set equal to $-IS_c$.

The following is a rule base which illustratively is used to determine the traffic load adjustment parameter y:

| Rule | q | Δq | p$_l$ | y |
|------|---|----|----|---|
| 1 | E | N | S | IM |
| 2 | E | N | NS | IM |
| 3 | E | P | S | IS |
| 4 | E | P | NS | M |
| 5 | F | N | S | IM |
| 6 | F | N | NS | IM |
| 7 | F | P | S | DS |
| 8 | F | P | NS | NC |

In each rule (e.g., the rule 3), the left three columns (of linguistic variables q, Δq and p$_l$) specify term sets (e.g., E, N and S, respectively) of a condition. Membership values of the corresponding input linguistic variables q, Δq and p$_l$ in their respective term sets (e.g., E, N and S, respectively) are conjunctivaly combined in order to determine whether the rule "fires," i.e., if the condition of the rule is true. In the event the rule fires, the result of the rule is the membership of a specific constant in the corresponding term set of the linguistic variable y. For instance, rule 1 is:

If $q=E \wedge \Delta q=N \wedge p_l=S$ Then $y=IM$

Stated in plain english: If the queue is relatively empty, the rate of queue occupancy is decreasing and the cell loss probability is within satisfactory limits then the traffic can be adjusted upward by a large amount. Fuzzy logic enables modelling and evaluation of imprecise predicates such as "is relatively empty" or "is within satisfactory limits." Furthermore, fuzzy logic enables determination of imprecise values such as "large amount." To evaluate each rule, a function is formed from the results of evaluating the membership function on the three variables q, Δq and p of the condition of the rule. The result of this function is then multiplied by the result of evaluating the membership function of the variable y of the consequence of the rule. For instance, the function on the membership function results of the variables q, Δq and p may simply be the product of these results. Preferably, the function is the minimum of the results of evaluating each membership function. The minimum (or product) is then multiplied with the result of evaluating the membership function of the specific constant $IM_c$ in the term set IM to produce a weight for the term set constant $IM_c$, namely, $w_{IM}$. Thus, for rule 8:

$$w_{NC} = \min(\mu_F(q), \mu_P(\Delta q), \mu_{NS}(p_l)) \cdot \mu_{NC}(NC_c)$$

The crisp traffic load adjustment parameter y can be determined by forming a weighted average of all of the weights and their corresponding term set constants (which term set constants are contained in at least one rule). Thus:

$$y_0 = \frac{w_{IM} \cdot IM_c + w_{IS} \cdot IS_c + w_{NC} \cdot NC_c + w_{DS} \cdot DS_c}{w_{IM} + w_{IS} + w_{NC} + w_{DS}}$$

Note that some rules have the same term set for the traffic load adjustment linguistic variable y. For instance, rules 1, 2, 4, 5 and 6 all have the term set IM. The rules of the rule base are presumed to fire conjunctivaly, i.e., each rule fires with different degree. Therefore, to determine the weight (e.g., $w_{IM}$) associated with constants, such as $IM_c$, of resultant term sets, such as IM, in more than one rule, the weight is determined for each of the rules containing the same resultant term set IM (i.e., $w1 = \min(\mu_E(q), \mu_N(\Delta q), \mu_S(p_l)) \cdot \mu_{IM}(IM_c)$, $w2 = \min(\mu_E(q), \mu_N(\Delta q), \mu_{NS}(p_l)) \cdot \mu_{IM}(IM_c)$, etc.) The maximum of these weights is then selected as the weight associated with the constant $IM_c$, i.e., $w_{IM} = \max(w1, w2, w4, w5, w6)$. The above evaluation and production process for producing the crisp value "$y_0$" from the "fuzzified" parameters q, Δq and p$_l$ is referred to as the "min-max" process.

The crisp traffic adjustment parameter $y_0$ thus determined illustratively is outputted to the coding rate manager 260 (FIG. 7) or the transmission rate manager 270 (FIG. 7) depending on whether $y_0$ is determined for the queue 110 (FIG. 6) or the queue 120 (FIG. 6). In response, the coding rate manager 260 (FIG. 7) or transmission rate manager 270 (FIG. 7) outputs an appropriate signal for adjusting the transmission rate of the cell sources 130-1, 130-2, . . . , 130-M1 or 140-1, 140-2, . . . , 140-M2.

Note that there is some disparity in selection of terms for the traffic load adjustment parameter y. That is, two different terms are provided for increasing traffic load, namely, IM and IS, but only one term is provided for decreasing traffic load, namely DS. This is because the node 100 (FIG. 6) is presumed to increase cell traffic from zero until the onset of congestion, at which point the load of cell traffic is maintained or decreased some what to avert congestion.

The operation of the fuzzy bandwidth calculator 210 (FIG. 7) is now described. Illustratively, each cell source 130-1, 130-2, . . . , 130-M1 or 140-1, 140-2, . . . , 140-M2 writes certain parameters in each request to admit a new communication to the node (FIG. 6). These parameters include the peak bandwidth $R_p$, the mean bandwidth $R_m$, the peak bandwidth burst period $T_p$ and the QoS of the new communication. In response to these parameters, the fuzzy bandwidth calculator 210 determines a bandwidth capacity requirement $C_e$ of each request using a fuzzy logic rule base.

Simulations have revealed that the following term sets are optimal for calculating the bandwidth capacity requirement $C_e$: $T(R_p)=\{S, M, L\}$, $T(R_m)=\{Lo, Hi\}$, $T(T_p)=\{Sh, Me, Lg\}$ and $T(C_e)=\{C_1, C_2, C_3, C_4, C_5, C_6\}$ where:

S means a small peak bandwidth

M means a medium peak bandwidth

L means a large peak bandwidth

Lo means a low mean bandwidth

Hi means a high mean bandwidth

Sh means a short peak bandwidth burst period

Me means a medium peak bandwidth burst period

Lg means a long peak bandwidth burst period $C_1$ means a first bandwidth capacity level $C_2$ means a second bandwidth capacity level $C_3$ means a third bandwidth capacity level $C_4$ means a fourth bandwidth capacity level $C_5$ means a fifth bandwidth capacity level, and $C_6$ means a sixth bandwidth capacity level. Illustratively, the following membership functions are used to "fuzzify" the parameters $R_p$, $R_m$ and $T_p$ and selected bandwidth capacity requirement parameters $C_1, C_2, C_3, C_4, C_5$ and $C_6$:

$\mu_S(R_p)=g(\log(R_p);\log(R_{p,min}),S_e,O,S_w)$ $\mu_M(R_p)=g(\log(R_p);M_c,M_{w0},M_{w1})$ $\mu_L(R_p)=g(\log(R_p);L_e,\log(R_{p,max}),L_w,O)$ $\mu_{Lo}(R_m)=g(R_m/R_p;O,Lo_e,O,Lo_w)$ $\mu_{Hi}(R_m)=g(R_m/R_p;Hi_e,1,Hi_w,O)$ $\mu_{Sh}(T_p)=g(\log(T_p);\log(T_{p,min}),Sh_e,O,Sh_w)$ $\mu_{Me}(T_p)=f(\log(T_p);Me_c,Me_{w0},Me_{w1})$ $\mu_{Lg}(T_p)=g(\log(T_p);Lg_e,\log(T_{p,min}),Lg_w,O)$ $\mu_{C_1}(C_e)=f(C_e;C_{1,c},O,O)$ $\mu_{C_2}(C_e)=f(C_e;C_{2,c},O,O)$ $\mu_{C_3}(C_e)=f(C_e;C_{3,c},O,O)$ $\mu_{C_4}(C_e)=f(C_e;C_{4,c},O,O)$ $\mu_{C_5}(C_e)=f(C_e;C_{5,c},O,O)$ $\mu_{C_6}(C_e)=f(C_e;C_{6,c},O,O)$ $R_{p,min}$, $R_{p,max}$, $T_{p,min}$ and $T_{p,max}$ are the minimum and maximum possible values for $R_p$ and $T_p$, respectively. $S_e$, $S_w$, $M_c$, $M_{w0}$, $M_{w1}$, $L_e$, $L_w$, $Lo_e$, $Lo_w$, $Hi_e$, $Hi_w$, $Sh_e$, $Sh_w$, $Me_c$, $Me_{w0}$, $Me_{w1}$, $Lg_e$, $Lg_w$, $C_{1,c}$, $C_{2,c}$, $C_{3,c}$, $C_{4,c}$, $C_{5,c}$, and $C_{6,c}$ are predetermined constants of the terms $T(R_p)=\{S,M,L\}$, $T(R_m)=\{Lo,Hi\}$, $T(T_p)=\{Sh,Me,Lg\}$, $T(C_e)=\{C_1, C_2, C_3, C_4, C_5, C_6\}$. Through simulation of the equivalent capacity model, the constants $S_e$, $M_c$, $L_e$, $Lo_e$, $Hi_e$, $Sh_e$, $Me_c$ and $Lg_e$ can be set to proper boundary values to characterize the parameters $R_p$, $R_m/R_p$ and $T_p$ of the equivalent capacity model. Advantageously, $S_w=M_{w0}=M_c-S_e$, $M_{w1}=L_w=L_e-M_c$, $Lo_w=Hi_w=Hi_e-Lo_e$. Furthermore, the following initial assignments can be made which assignments are later fine tuned: $Sh_w=Me_{w0}=Me_c-Sh_e$, $Me_{w1}=Lg_w=Lg_e-Me_c$. The constant $C_{1,c}=R_m$. The constants $C_{2,c}, C_{3,c}, C_{4,c}, C_{5,c}$, and $C_{6,c}$ can be determined by the recursive formula:

$$C_{i,c} = C_{i-1,c} + \frac{(R_p - R_m)}{5}$$

The fuzzy rule base is then as follows:

| Rule | $R_p$ | $R_m$ | $T_p$ | $C_e$ |
| --- | --- | --- | --- | --- |
| 1 | S | Lo | Sh | $C_1$ |
| 2 | S | Lo | Me | $C_2$ |
| 3 | S | Lo | Lg | $C_5$ |
| 4 | S | Hi | Sh | $C_1$ |
| 5 | S | HI | Me | $C_1$ |
| 6 | S | Hi | Lg | $C_4$ |
| 7 | M | Lo | Sh | $C_1$ |
| 8 | M | Lo | Me | $C_3$ |
| 9 | M | Lo | Lg | $C_6$ |
| 10 | M | Hi | Sh | $C_1$ |
| 11 | M | Hi | Me | $C_2$ |
| 12 | M | Hi | Lg | $C_5$ |
| 13 | L | Lo | Sh | $C_4$ |
| 14 | L | Lo | Me | $C_6$ |
| 15 | L | Lo | Lg | $C_6$ |
| 16 | L | Hi | Sh | $C_3$ |
| 17 | L | Hi | Me | $C_5$ |
| 18 | L | HI | Lg | $C_6$ |

As in the fuzzy congestion controller 230 (FIG. 7), for each rule, the membership values of each term of the linguistic variable $R_p$, $R_m$, or $T_p$ are conjunctivaly joined to form a condition that controls the firing of the rule. The right-most column is the result produced when the rule fires. The rules are evaluated and a crisp bandwidth capacity requirement $C_e$ is produced using the above-described "min-max" process.

The operation of the fuzzy admission controller 220 (FIG. 7) is now described. The fuzzy admission controller 220 (FIG. 7) receives the traffic load adjustment parameter y from the congestion controller 230 (FIG. 7), the allocatable bandwidth capacity $C_a$ from the network resource manager 240 (FIG. 7) and the cell loss probability $p_l$. (Recall that the allocatable bandwidth capacity $C_a$ is generated by the network resource manager circuit 240 from the bandwidth capacity requirement $C_e$.) The parameters y and $p_l$ received correspond to the queue in which the cells of the new communication will be temporarily stored if the new communication is admitted. Through simulation, the following term sets are been defined for the parameters y, $C_a$ and z: $T(C_a)=\{NE, E\}$, $T(y)=\{N, P\}$ and $T(z)=\{R, WR, WA, A\}$ where NE means not enough bandwidth capacity for new communications E means enough bandwidth capacity for new communications N means traffic load condition is congested P means traffic load condition is not congested R means reject request to admit the new communication WR means weakly reject request to admit the new communication WA means weakly accept request to admit the new communication, and A means accept request to admit the new communication. The rule base of the fuzzy admission controller 220 (FIG. 7) includes the following membership functions for fuzzifying the parameters y, $C_a$ and z:

$\mu_{NE}(C_a)=g(Ca;O,NE_e,O,NE_w)$ $\mu_E(C_a)=g(Ca;E_e,C,E_w,O)$ $\mu_N(y)=g(y;-y_{max},N_e,O,N_w)$ $\mu_P(y)=g(y;P_e,y_{max},P_w,O)$ $\mu_R(z)=f(z;R_c,O,O)$ $\mu_{WR}(z)=f(z;WR_c,O,O)$ $\mu_{WA}(z)=f(z;WA_c,O,O)$ $\mu_A(z)=f(z;A_c,O,O)$ The constant $y_{max}$ is the maximum percentage of cells which are ever prohibited from entering the node 100. $NE_e$, $NE_w$, $E_e$, $E_w$, $N_e$, $N_w$, $P_e$, $P_w$, $R_c$, $WR_c$, $WA_c$, and $A_c$ are predetermined constants. Suppose there are J types of queues 110 and 120 in the node 100 (of FIG. 6), including one queue for each $j^{th}$ type of QoS. Furthermore, suppose that $C_j$ is the fraction of the total bandwidth utilized for the $j^{th}$ type of QoS (which $j^{th}$ type of QoS is specified in the request to admit the communication). In such a case, $E_e$ is set to a fraction of $C_j$ which fraction is selected to tolerate a traffic load estimation uncertainty that results from the dynamics of traffic characteristics and a fuzzy implementation of the equivalent capacity model used to adjust the traffic load. $NE_c$ is smaller than $E_e$ and is selected so as to represent the emergency of the lack of bandwidth capacity for allocation to new communications. The constants $N_e$ and $P_e$ are set by monitoring the traffic load adjustment parameter y of the fuzzy congestion controller 230 (FIG. 7) in simulation to determine the traffic load thresholds during congestion and during no congestion, respectively. Generally speaking, these parameters must be calibrated by simulation because the nature of congestion depends on different traffic environments. The constant $R_c$ is set equal to 0 and the constant $A_c$ is set equal to 1. Without loss of generality, $WR_c$ is set equal to $(R_c+z_a)/2$ and $WA_c$ is set equal to $(A_c+z_a)/2$, where $z_a$ is a predetermined acceptance threshold $R_c \leq z_a \leq A_c$.

Note that the same term sets and membership functions are used for the parameter y in the fuzzy admission controller 220 (FIG. 7) and in the fuzzy congestion controller 230 (FIG. 7). The term sets and membership functions defined on the parameter $p_l$ are given above.

The fuzzy rule base in the fuzzy admission controller 220 includes the following rules:

| Rule | $p_1$ | y | $C_a$ | z |
|---|---|---|---|---|
| 1 | S | N | NE | WR |
| 2 | S | N | E | WA |
| 3 | S | P | NE | WA |
| 4 | S | P | E | A |
| 5 | NS | N | NE | R |
| 6 | NS | N | E | R |
| 7 | NS | P | NE | R |
| 8 | NS | P | E | WR |

The evaluation of the rules and defuzzification of the decision signal parameter z is similar to that described above. If the crisp decision signal $z_0$ is greater than $z_a$ then the request to admit the new communication is accepted. Otherwise, the decision signal $z_0$ indicates that the request is rejected.

The performance of the fuzzy traffic controller 150 (FIGS. 6 and 7) is analyzed by simulation. In the simulation, two types of cell sources are considered. A first type of cell source transmits audio, video or interactive data. Communications of such cell sources generally can tolerate a certain number of discarded cells. However, cells generated by such sources are time sensitive; communication of cells cannot tolerate high delays. The second type of cell source transmits transactional computer data. Communications from such sources cannot tolerate very many discarded cells but are not time sensitive; such sources can tolerate high delays. A first queue 110 (FIG. 6) is provided for cells of the first type with a maximum occupancy of $K_1=100$. A second queue 120 (FIG. 6) is provided for cells of the second type with a maximum occupancy of $K_2=100$. The QoS for the two types of service are all assumed to be $10^{-5}$.

For purposes of comparison, the equivalent capacity process suggested by the Guèrin reference and the two-threshold process for traffic control suggested by the Li reference were also simulated. Under the simulation, each new communication is initiated by a communication set up process. A node determines whether or not the new communication can be admitted while still maintaining the QoS of the other communications already admitted. Traffic loads were also increased to simulate congestion at the node.

The following constants were used in the simulation:

(1) fuzzy congestion controller 230 (FIG. 7):
for $T(\Delta q)=\{N,P\}N_e=-1$, $P_e=1$ and $N_w=P_w=2$;
for $T(p_1)=\{S,NS\}S_e=5 \cdot 10^{-6}$, $NS_e=10^{-5}$ and $S_w=NS_w=5 \cdot 10^{-6}$;
for $T(q)=\{E,F\}E_e=L_1=75$, $F_e=L_2=90$ and $E_w=F_w=15$ (note that $L_1$ and $L_2$ are the two thresholds in the two threshold congestion control process); and
for $T(y)=\{DS, NC, IS, IM\}DS_c=-0.2/3$, $NC_c=0$, $IS_c=0.2/3$ and $IM_c=0.2$.

(2) fuzzy bandwidth calculator 210 (FIG. 7):
for $T(R_p)=\{S,M,L\}S_e=-3$, $S_w=0.9$, $M_c=-2$, $M_{w0}=M_{w1}=1$, $L_e=-1$ and $L_w=0.9$,
where $R_{p,max}=1$ and $R_{p,min}=10^{-4}$;
for $T(R_m)=\{Lo, Hi\}Lo_e=0.6$, $Lo_w=0.15$, $Hi_e=0.75$ and $Hi_w=0.1$;
for $T(T_p)=\{Sh, Me, Lg\}Sh_e=-3$, $Sh_w=0.7$, $Me_c=-2$, $Me_{w0}=Me_{w1}=0.8$, $Lg_e=-1$ and $Lg_w=0.7$, where $T_{p,max}=100$ seconds and $T_{p,min}=10^{-9}$ seconds; and
for $T(C_e)=\{C_1, C_2, C_3, C_4, C_5, C_6\}$ the constants are as described above.

(3) fuzzy admission controller 220 (FIG. 7):
for $T(C_a)=\{NE, E\}NE_e=0.05 \cdot C_j$, $E_e=0.1 \cdot C_j$ and $NE_w=E_w=0.05 \cdot C_j$, where $C_{j=1}=0.8$, $C_{j=2}=0.2$;
for $T(y)=\{N, P\}N_e=-y_{max}/5$, $P_e=y_{max}/5$ and $N_w=P_w=2 \cdot y_{max}/5$, where $y_{max}=IM_c=0.2$; and
for $T(z)=\{R, WR, WA, A\}R_c=0$, $A_c=1$, $WR_c=0.25$, $WA_c=0.75$ and $z_a=0.5$.

The combined cell loss rate PC and the system utilization are used as a basis for comparing the fuzzy logic controller of the present invention to the prior art. The combined loss rate for the first and second types of cell traffic is given by:

$$P_c=(1-\zeta) \cdot P_1+\zeta P_2$$

Here, a variable $\zeta$ ($0 \leq \zeta \leq 1$) is introduced to differentiate the two types of cell traffic. Since the second type of cell traffic can retransmit cells and have them received in their entirety at the destination, even in the event the cell is discarded, $\zeta$ is set equal to 0.2. As noted earlier, congestion can be alleviated by selectively discarding cells of type 1 cell traffic. Thus for type 1 cell traffic, define a preselected cell loss rate $P_{s,j}$, and cell loss $P_{N,j}$, which occurs if the queue is full. As such:

$$P_j=k \cdot P_{s,j}+P_{Nj} \text{ for } j=1 \text{ or } 2$$

where k is a proportionality constant ($0 \leq k \leq 1$). Illustratively, k is set equal to 0.8.

Figure 8:
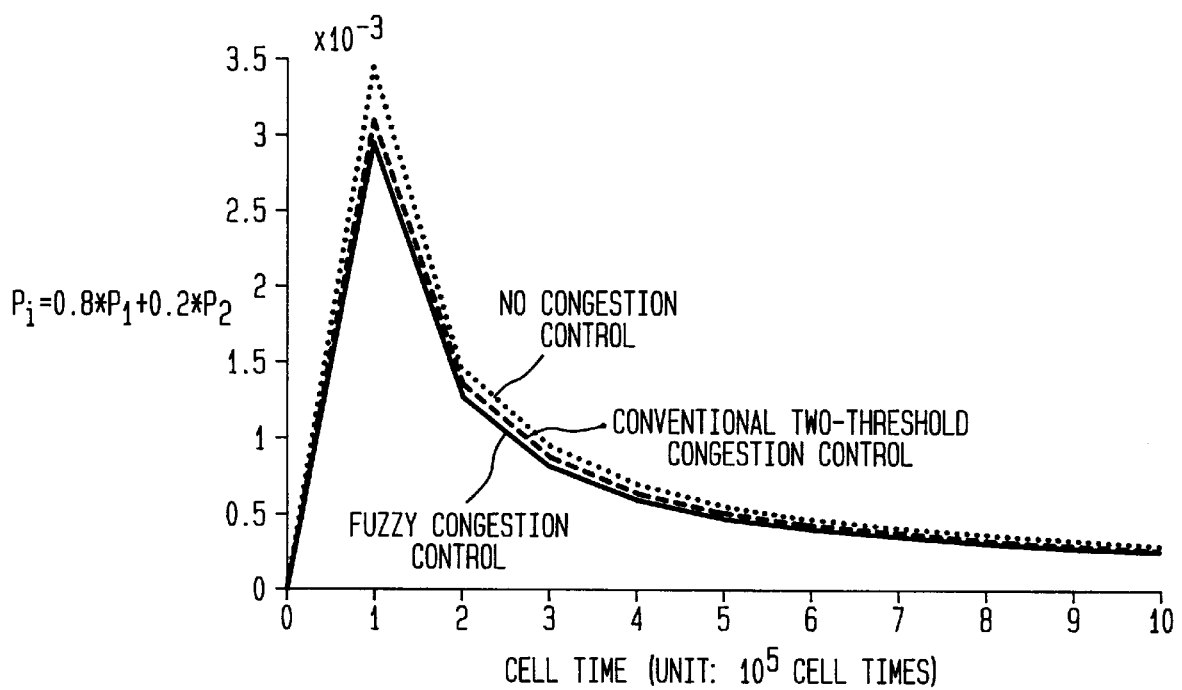
FIG. 8 is a graph illustrating the improvement in cell loss probability during a congestion period.

FIG. 8 illustrates a congestion scenario wherein congestion occurs at time $t=1$ ($10^5$ cell units). At time $t=10$ ($10^6$ cell units), congestion alleviates and the QoS of each communication is recovered. As shown in FIG. 8, the present invention provides an improvement over the prior art. Specifically, the present invention provides an 11% improvement over the prior art system in which no congestion control is used and a 4% improvement over the two-threshold congestion control process suggested by the Li reference.

Figure 9:
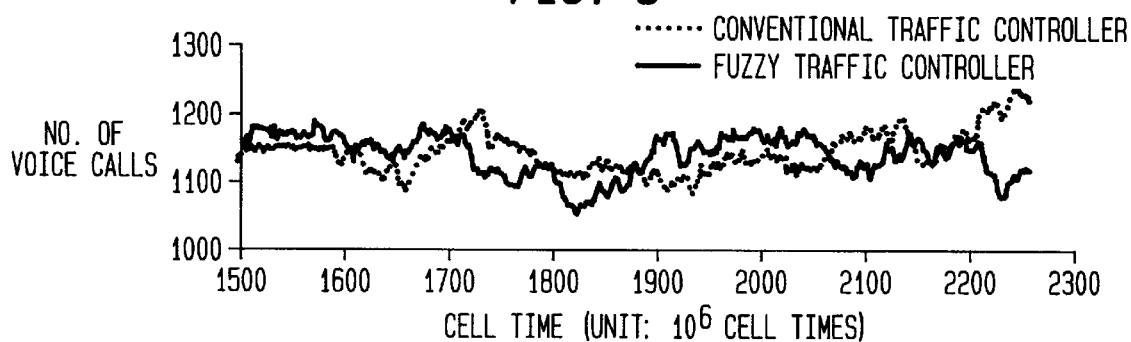
FIGS. 9–19 are graphs illustrating the improvement in admitted number of communications, rejected communications and overall bandwidth utilization by the present invention.
Figure 10:
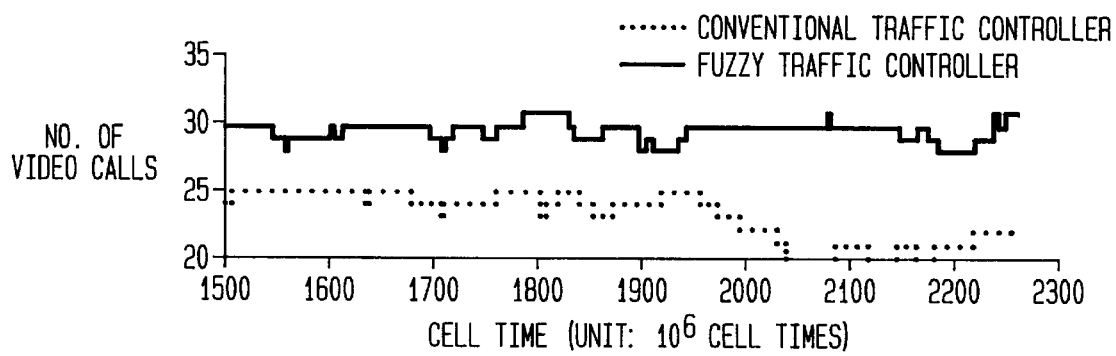
Figure 11:
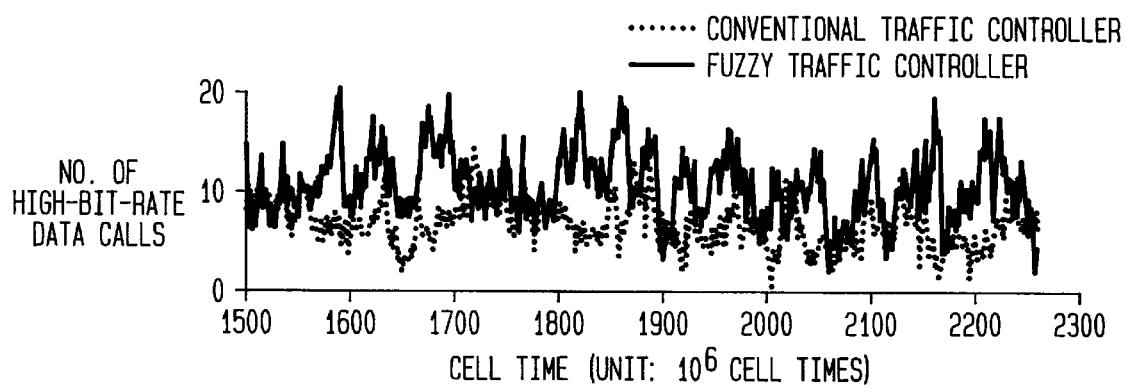
Figure 12:
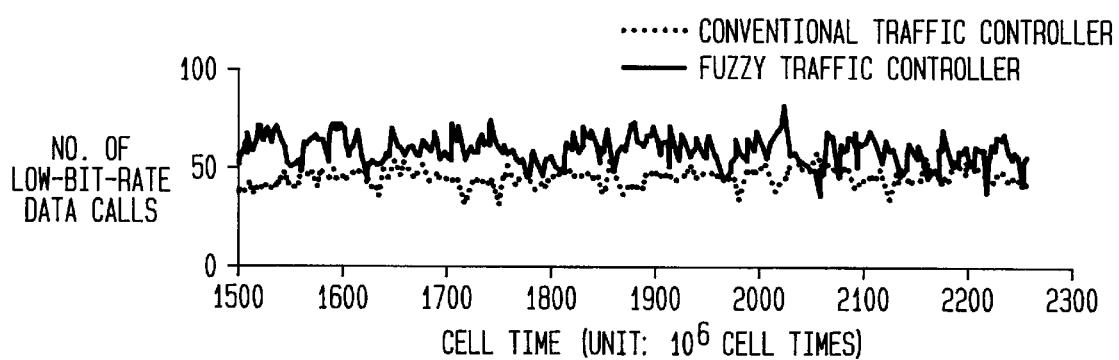
Figure 13:
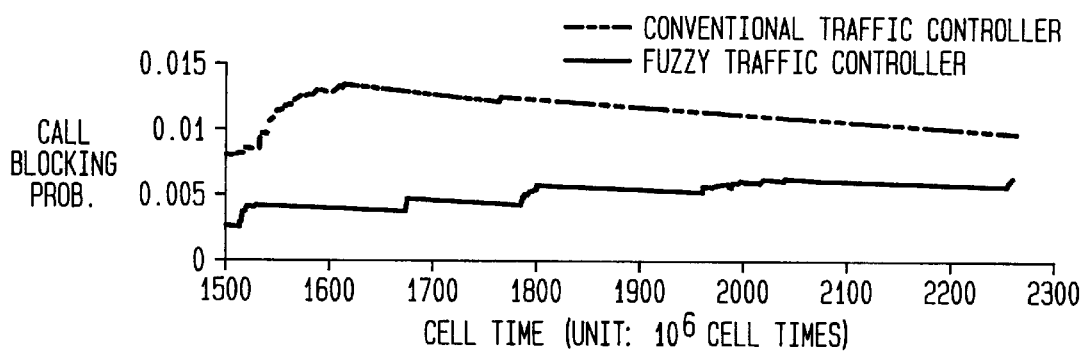
Figure 14:
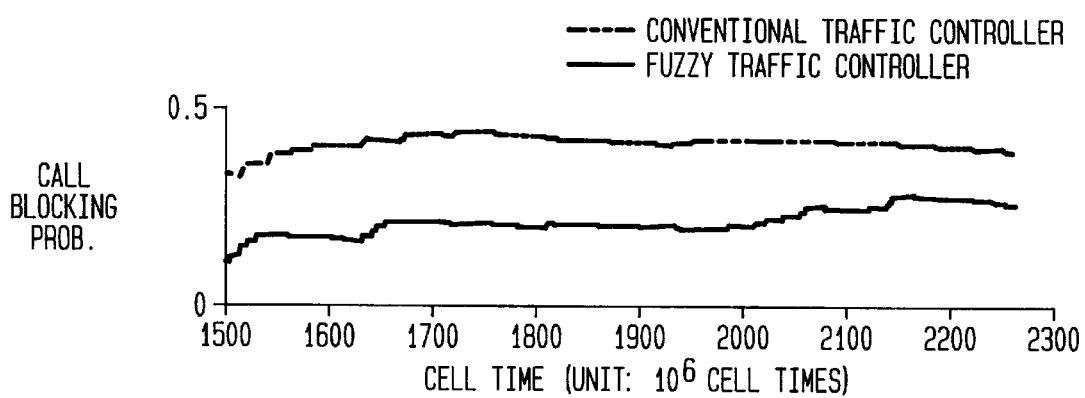
Figure 15:
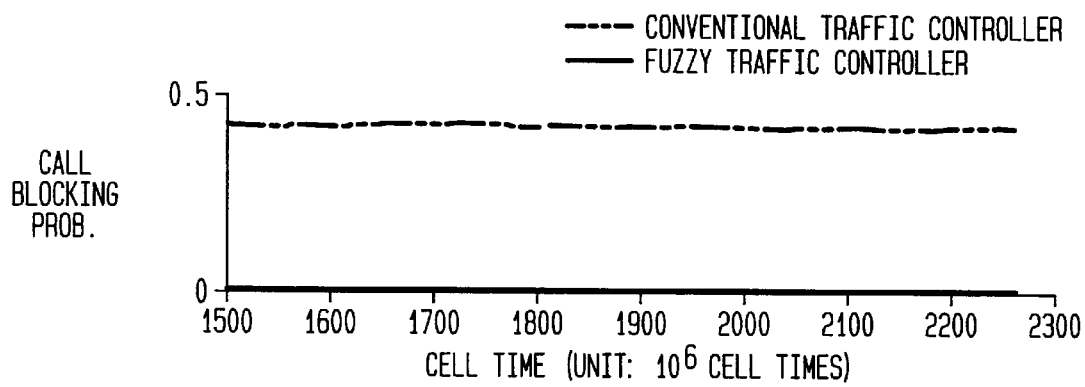
Figure 16:
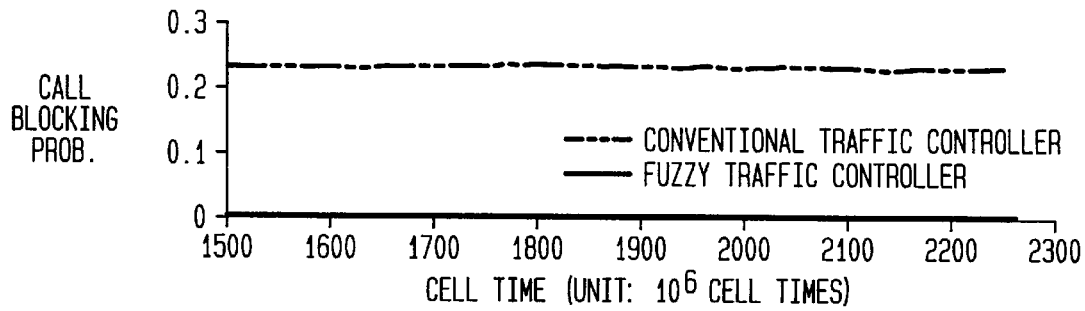
Figure 17:
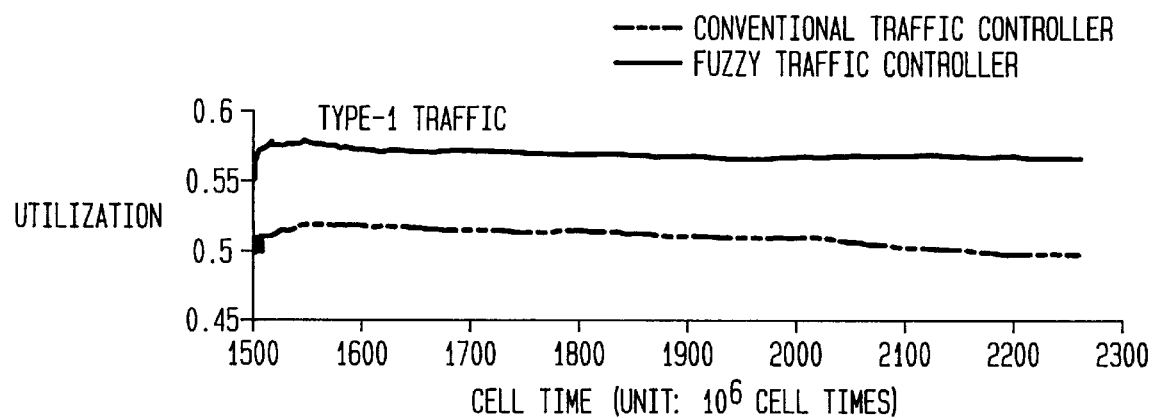
Figure 18:
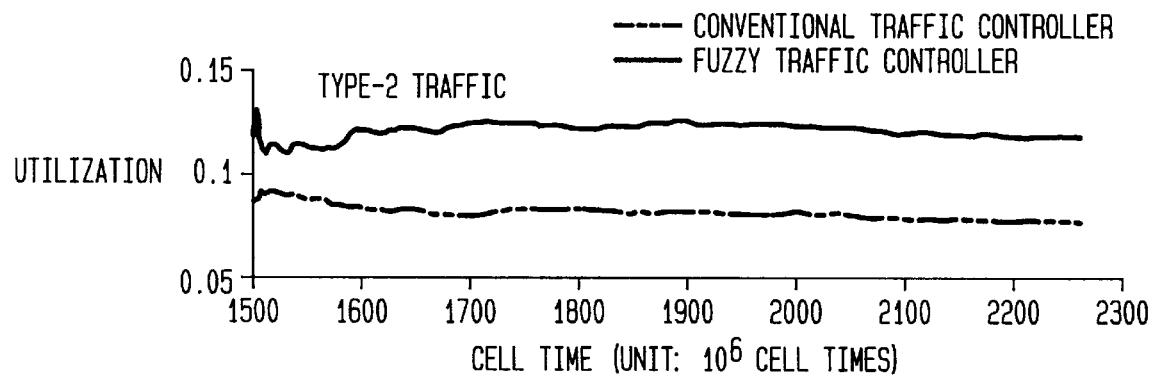
Figure 19:
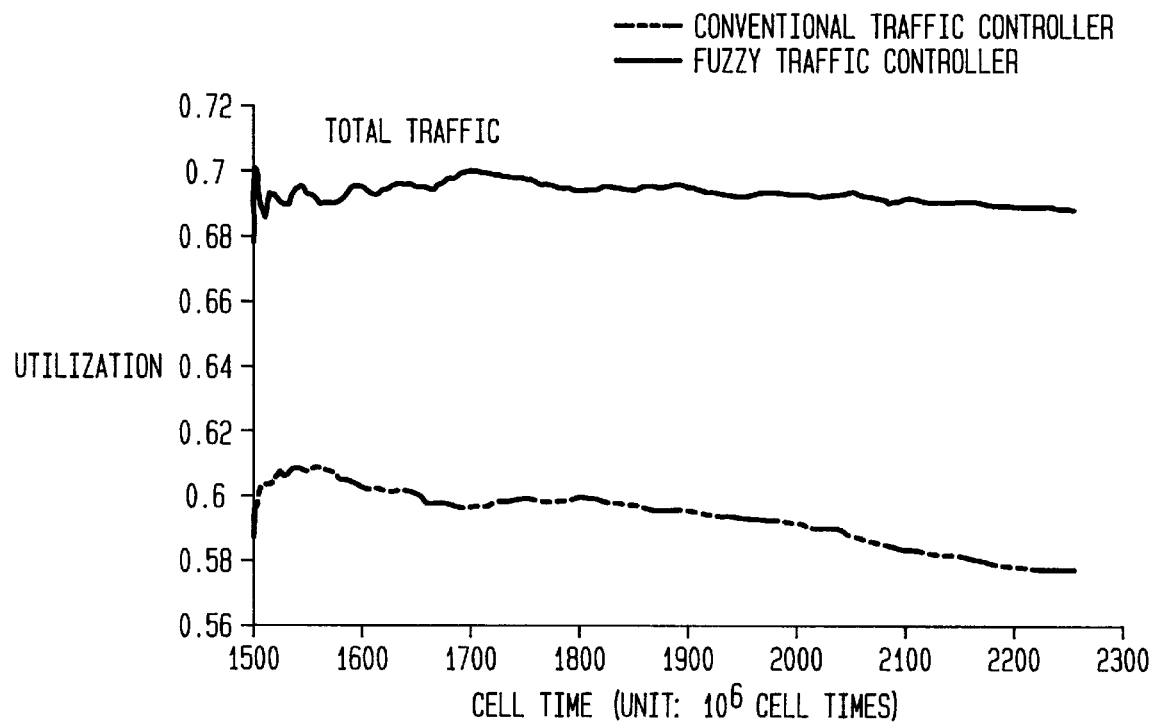

FIGS. 9–19 illustrate admission control. FIGS. 9 and 10 depict the number of interactive voice and video communications admitted over time according to the present invention versus the equivalent bandwidth method proposed by Guèrin. Likewise, FIGS. 11 and 12 depict the number of high bitrate and low bitrate transactional data communications admitted over time according to the present invention versus the equivalent bandwidth method proposed by Guèrin. In FIGS. 9–12, the number of all traffic users changes with time under two different congestion control methods. As shown, the present invention admits more communications of each type than the conventional equivalent bandwidth method proposed by the Guèrin reference. FIGS. 13, 14, 15, and 16 depict the call rejection probability for interactive voice, video, high bitrate transactional and low bitrate transactional communications, respectively. In FIGS. 13–16, the communication rejection probability is changed for each type of traffic in relation to time. Again, the present invention admits more communications of each type than the conventional equivalent bandwidth method proposed by the Guèrin reference and therefore has a low communication rejection probability. FIGS. 17, 18 and 19 graph the utilization of type-1 (e.g., interactive voice and video), type-2 (transactional) and total cell traffic. The fuzzy traffic controller according to the present invention provides an overall 11% increase in bandwidth utilization over Guèrin.

In short, a fuzzy traffic controller is provided for controlling admission of new communications to the node (and cells thereof to plural queues) and for adjusting the rate at which each other node transmits cells to the node (for insertion in the plural queues) for each communication already admitted. The fuzzy traffic controller has a fuzzy bandwidth calculator, a fuzzy admission controller and a fuzzy congestion controller. The fuzzy congestion controller receives queue occupancy q, rate of variance of queue occupancy $\Delta q$ and cell loss probability $p_1$ parameters. The fuzzy congestion controller "fuzzifies" these parameters, i.e., converts them to fuzzy values through predefined membership functions, and evaluates predetermined fuzzy rules on the "fuzzified" parameters. In evaluating the fuzzy logic rules, the fuzzy congestion controller determines a fuzzy value of the traffic load adjustment parameter y. The fuzzy congestion controller "defuzzifies" the fuzzy value of the traffic load adjustment parameter y, i.e., converts the traffic load adjustment parameter to a "crisp" value through use of a predefined conversion formula. The fuzzy traffic controller uses the crisp traffic load adjustment parameter y to output a signal to each node that supplies cells to the node containing the fuzzy traffic controller for adjusting (i.e., blocking/unblocking or controlling the level of cell encoding and production) the cell transmission rate for each communication. The fuzzy bandwidth calculator receives the mean bandwidth $R_m$, the peak bandwidth $R_p$ and the peak bandwidth burst period $T_p$ for each new communication requesting admission to the node. The fuzzy bandwidth calculator "fuzzifies" these parameters and evaluates a set of predetermined fuzzy logic rules on the fuzzified parameters. In evaluating the predetermined fuzzy logic rules, the fuzzy bandwidth calculator determines a bandwidth capacity requirement parameter $C_e$. The fuzzy bandwidth calculator "defuzzifies" the bandwidth capacity requirement parameter $C_e$. The fuzzy admission controller receives an available bandwidth capacity parameter $C_a$ (which is determined from the bandwidth capacity requirement parameter $C_e$), the traffic load adjustment parameter y determined by the fuzzy congestion controller and the cell loss probability $p_1$. The fuzzy admission controller "fuzzifies" theses received parameters and evaluates a set of predetermined logic rules thereon. In evaluating the fuzzy logic rules, the fuzzy admission controller determines an admission request decision signal z. The fuzzy admission controller "defuzzifies" the admission request decision signal z and outputs it to the node which requested admission of the communication.

Finally, the above discussion is merely illustrative of the invention. Those having ordinary skill in the art may devise numerous alternative embodiments without departing from the spirit and scope of the following claims.

The invention claimed is:

1. A process for controlling congestion in a node of a communications network comprising the steps of:
    (a) determining the occupancy q, rate of variation of queue occupancy $\Delta q$ and cell loss probability $p_1$ traffic parameters of a queue corresponding to a type of communication controlled by said node,
    (b) evaluating plural fuzzy logic rules on each of said traffic parameters q, $\Delta q$ and $p_1$ to determine a traffic load adjustment parameter y, and
    (c) outputting a signal for adjusting the rate at which cells are generated which depends on said traffic load adjustment parameter y to each other node which generates cells for each of said types of communications controlled by said node.

2. The process of claim 1 wherein said step of evaluating further comprises the steps of:
    determining the membership of said traffic parameters q, $\Delta q$ and $p_1$ in each term of term sets T(q), T($\Delta q$) and T($p_1$) contained in said predetermined logic rules, and of predetermined traffic load adjustment constants in each term of term sets T(y), contained in said predetermined fuzzy logic rules,
    for each unique term in said term set T(y), which unique term is contained in said predetermined fuzzy logic rules, selecting a weight, wherein each weight is formed by multiplying the minimum or product of said memberships of q, $\Delta q$ and $p_1$ in respective term sets with and said membership of said predetermined traffic load adjustment constant contained one of said predetermined fuzzy logic rules, and
    determining said traffic load adjustment parameter y by forming a weighted average of each of said selected weights and said predetermined traffic load adjustment constants of corresponding terms in said term set T(y) of said traffic load adjustment parameter.

3. The process of claim 2 wherein said step of determining the membership of said traffic parameters q, $\Delta q$ and $p_1$ includes using discrete membership functions.

4. The process of claim 2 wherein T(q)={E,F}, T($\Delta q$)={N,P}, T($p_1$)={S,NS} and T(y)={IM, IS, DS, NC} where:

E means empty queue occupancy

F means full queue occupancy

N means negative growth in queue occupancy rate

P means positive growth in queue occupancy rate

S means satisfactory cell loss rate

NS means unsatisfactory cell loss rate

IM means increase traffic load at node much

IS means increase traffic load at node some what

DS means decrease traffic load at node some what, and

NC means no change in traffic load at node, and wherein said predetermined fuzzy logic rules are:

| Rule | q | Δq | $p_l$ | y |
|------|---|----|----|---|
| 1 | E | N | S | IM |
| 2 | E | N | NS | IM |
| 3 | E | P | S | IS |
| 4 | E | P | NS | IM |
| 5 | F | N | S | IM |
| 6 | F | N | NS | IM |
| 7 | F | P | S | DS |
| 8 | F | P | NS | NC |

5. The process of claim 3 wherein said step of determining the membership of said traffic parameters q, Δq and $p_1$ includes using membership functions $\mu_E, \mu_F, \mu_N, \mu_P, \mu_S, \mu_{NS}, \mu_{IM}, \mu_{IS}, \mu_{DS}$ and $\mu_{NC}$ of said terms E, F, N, P, S, NS, IM, IS, DS and NC given by:

$$\mu_E(q) = g(q; O, E_e, O, E_w)$$

$$\mu_F(q) = g(q; F_e, K_i, F_w, O)$$

$$\mu_N(\Delta q) = g(\Delta q; -K_i, N_e, O, N_w)$$

$$\mu_P(\Delta q) = g(\Delta q; P_e, K_i, P_w, O)$$

$$\mu_S(p_l) = g(p_l; O, S_e, O, S_w)$$

$$\mu_{NS}(p_l) = g(p_l; NS_e, 1, NS_w, O)$$

$$\mu_{IM}(y) = f(y; IM_c, O, O)$$

$$\mu_{IS}(y) = f(y; IS_c 2, O, O)$$

$$\mu_{DS}(y) = f(y; DS_c, O, O)$$

$$\mu_{NC}(y) = f(y; NC_c, O, O)$$

where $g(x; x_0, x_1, a_0, a_1)$ is a trapezoidal function with trapezoidal plateau ordinate of 1 and with left trapezoidal plateau abscissa edge point $x_0$, right trapezoidal plateau abscissa edge point $x_1$, left triangular portion abscissa width $a_0$ and right triangular portion abscissa width $a_1$, where $f(x; x_0, a_0, a_1)$ is a triangle function with maximum ordinate of 1 with abscissa center point $x_0$, left triangle portion width $a_0$ and right triangular portion width $a_1$ and where $E_e, E_w, F_e, K_j, F_w, N_e, N_w, P_e, P_w, S_e, S_w, NS_e, NS_w, IM_c, IS_c, DS_c, NC_c$ are predetermined constants of said terms $T(q), T(\Delta q), T(p_1)$ and $T(y)$.

6. The process of claim 1 wherein said type of communications corresponds to different quality of services, said process further comprising performing said steps (a)–(c) for a second queue associated with a different type of communications.

7. A process for predicting a bandwidth requirement for each request to admit a new communication to a node of a communications network comprising:

(a) receiving at a node, peak bandwidth $R_p$, mean bandwidth $R_m$ and burst duration $T_p$ transmission rate parameters of said new communication from another node which issued a request to admit said new communication, (b) evaluating a first plurality of fuzzy logic rules on said transmission rate parameters $R_p$, $R_m$ and $T_p$ to determine a bandwidth capacity requirement $C_e$ of said new communication, (c) determining an allocatable bandwidth capacity $C_a$ based on said bandwidth capacity requirement $C_e$, and (d) evaluating a second plurality of fuzzy logic rules on at least said allocatable bandwidth capacity $C_a$ to determine a decision signal z indicating whether or not to admit said new communication.

8. The process of claim 7 wherein said step of evaluating a first plurality of fuzzy logic rules comprises the steps of:

determining the membership of said transmission rate parameters $R_p$, $R_m$ and $T_p$ in each term, of term sets $T(R_p)$, $T(R_m)$ and $T(T_p)$, contained in said first plurality of fuzzy logic rules, and of predetermined bandwidth capacity requirement constants of each term in term set $T(C_e)$ in said first plurality of fuzzy logic rules, for each unique term in said terms set $T(C_e)$ which unique term is contained in said first plurality of rules, selecting one weight, which weights are each formed by multiplying the minimum or product of said memberships of said parameters $R_p$, $R_m$ and $T_p$ in respective term sets with said membership of said bandwidth capacity requirement constants contained in each rule of said first set of fuzzy logic rules, and determining said bandwidth capacity requirement $C_e$ by forming a weighted average of said weights and said predetermined bandwidth capacity requirement constants of each corresponding term in said term set $T(C_e)$ of said bandwidth capacity requirement constants.

9. The process of claim 8 wherein $T(R_p) = \{S, M, L\}$, $T(R_m) = \{Lo, Hi\}$, $T(T_p) = \{Sh, Me, Lg\}$ and $T(C_e) = \{C_1, C_2, C_3, C_4, C_5, C_6\}$ where:

S means a small peak bandwidth

M means a medium peak bandwidth

L means a large peak bandwidth

Lo means a low mean bandwidth

Hi means a high mean bandwidth

Sh means a short peak bandwidth burst period

Me means a medium peak bandwidth burst period

Lg means a long peak bandwidth burst period $C_1$ means a first bandwidth capacity level $C_2$ means a second bandwidth capacity level $C_3$ means a third bandwidth capacity level $C_4$ means a fourth bandwidth capacity level $C_5$ means a fifth bandwidth capacity level, and $C_6$ means a sixth bandwidth capacity level, and wherein said first plurality of fuzzy logic rules are:

| Rule | $R_p$ | $R_m$ | $T_p$ | $C_e$ |
|------|-------|-------|-------|-------|
| 1 | S | Lo | Sh | $C_1$ |
| 2 | S | Lo | Me | $C_2$ |
| 3 | S | Lo | Lg | $C_5$ |
| 4 | S | Hi | Sh | $C_1$ |
| 5 | S | Hi | Me | $C_1$ |
| 6 | S | Hi | Lg | $C_4$ |
| 7 | M | Lo | Sh | $C_1$ |
| 8 | M | Lo | Me | $C_3$ |
| 9 | M | Lo | Lg | $C_6$ |
| 10 | M | Hi | Sh | $C_1$ |
| 11 | M | Hi | Me | $C_2$ |
| 12 | M | Hi | Lg | $C_5$ |
| 13 | L | Lo | Sh | $C_4$ |
| 14 | L | Lo | Me | $C_6$ |
| 15 | L | Lo | Lg | $C_6$ |
| 16 | L | Hi | Sh | $C_3$ |

-continued

| Rule | $R_p$ | $R_m$ | $T_p$ | $C_e$ |
|------|-------|-------|-------|-------|
| 17 | L | Hi | Me | $C_5$ |
| 18 | L | Hi | Lg | $C_6$ |

10. The process of claim 9 wherein said step of determining the membership of said transmission rate parameters $R_p$, $R_m$ and $T_p$ includes using membership functions $\mu_S$, $\mu_M$, $\mu_L$, $\mu_{Lo}$, $\mu_{Hi}$, $\mu_{Sh}$, $\mu_{Me}$, $\mu_{Lg}$, $\mu_{C1}$, $\mu_{C2}$, $\mu_{C3}$, $\mu_{C4}$, $\mu_{C5}$ and $\mu_{C6}$ given by:

$$\mu_S(R_p)=g(\log(R_p);\log(R_{p,min}),S_e,O,S_w)$$

$$\mu_M(R_p)=g(\log(R_p);M_c,M_{w0},M_{w1})$$

$$\mu_L(R_p)=g(\log(R_p);L_e,\log(R_{p,max}),L_w,O)$$

$$\mu_{Lo}(R_m)=g(R_m/R_p;O,Lo_e,O,Lo_w)$$

$$\mu_{Hi}(R_m)=g(R_m/R_p;Hi_e,1,Hi_w,O)$$

$$\mu_{Sh}(T_p)=g(\log(T_p);\log(T_{p,min}),Sh_e,O,Sh_w)$$

$$\mu_{Me}(T_p)=f(\log(T_p);Me_c,Me_{w0},Me_{w1})$$

$$\mu_{Lg}(T_p)=g(\log(T_p);Lg_e,\log(T_{p,min}),Lg_w,O)$$

$$\mu_{C1}(C_e)=f(C_e;C_{1,c},O,O)$$

$$\mu_{C2}(C_e)=f(C_e;C_{2,c},O,O)$$

$$\mu_{C3}(C_e)=f(C_e;C_{3,c},O,O)$$

$$\mu_{C4}(C_e)=f(C_e;C_{4,c},O,O)$$

$$\mu_{C5}(C_e)=f(C_e;C_{5,c},O,O)$$

$$\mu_{C6}(C_e)=f(C_e;C_{6,c},O,O)$$

where $g(x;x_0,x_1,a_0,a_1)$ is a trapezoidal function with trapezoidal plateau ordinate of 1 and with left trapezoidal plateau abscissa edge point $x_0$, right trapezoidal plateau abscissa edge point $x_1$, left triangular portion abscissa width $a_0$ and right triangular portion abscissa width $a_1$, where $f(x;x_0,a_0,a_1)$ is a triangle function with maximum ordinate of 1 with abscissa center point $x_0$, left triangle portion width $a_0$ and right triangular portion width $a_1$ where $R_{p,min}$, $R_{p,max}$, $T_{p,min}$ and $T_{p,max}$ are the minimum and maximum possible values for $R_p$ and $T_p$, respectively and where $S_e$, $S_w$, $M_c$, $M_{w0}$, $M_{w1}$, $L_e$, $L_w$, $Lo_e$, $Lo_w$, $Hi_e$, $Hi_w$, $Sh_e$, $Sh_w$, $Me_c$, $Me_{w0}$, $Me_{w1}$, $Lg_e$, $Lg_w$, $C_{1,c}$, $C_{2,c}$, $C_{3,c}$, $C_{4,c}$, $C_{5,c}$, and $C_{6,c}$ are predetermined constants of said terms $T(R_p)=\{S,M,L\}$, $T(R_m)=\{Lo,Hi\}$, $T(T_p)=\{Sh,Me,Lo\}$, $T(C_e)=\{C_1, C_2, C_3, C_4, C_5, C_6\}$.

11. The process of claim 7 wherein said step of evaluating said second plurality of fuzzy logic rules comprises the steps of:

determining a cell loss probability $p_1$ and a traffic load adjustment parameter y at said node, determining the membership of said available capacity in each term of term set $T(C_a)$ of said allocatable bandwidth capacity $C_a$ contained in said second plurality of fuzzy rules, of predetermined decision signal constants in each term set $T(z)$ of said decision signal z contained in said second plurality of fuzzy rules, of said traffic load adjustment parameter y in each term of term set $T(y)$ of said traffic load adjustment parameter y contained in said second plurality of fuzzy rules, and of said cell loss probability parameter $p_1$ of each term of term set $T(p_1)$ of said cell loss probability $p_1$ traffic parameter contained in said second plurality of fuzzy logic rules, for each unique term in said term set $T(z)$, which unique term is contained in said second plurality of fuzzy logic rules, selecting one weight, which weights are each formed by multiplying the minimum or product of said memberships of said parameters $C_a$, y, and $p_1$ in respective term sets with said membership of said predetermined decision signal constants contained in a rule of said second plurality of fuzzy logic rules, and determining said decision signal z by forming a weighted average of said weights and said predetermined decision signal constants of each corresponding term in $T(z)$ of said decision signal.

12. The process of claim 11 wherein $T(C_a)=\{NE, E\}$, $T(y)=\{N, P\}$, $T(p_1)=\{S, NS\}$ and $T(z)=\{R, WR, WA, A\}$ where NE means not enough bandwidth capacity for new communications E means enough bandwidth capacity for new communications N means congested traffic load condition P means not congested traffic load condition S means satisfactory cell loss rate NS means unsatisfactory cell loss rate R means reject request to admit said new communication WR means weakly reject request to admit said new communication WA means weakly accept request to admit said new communication, and A means accept request to admit said new communication, and wherein said second plurality of fuzzy logic rules comprises:

| Rule | $p_1$ | y | $C_a$ | z |
|------|-------|---|-------|---|
| 1 | S | N | NE | WR |
| 2 | S | N | E | WA |
| 3 | S | P | NE | WA |
| 4 | S | P | E | A |
| 5 | NS | N | NE | R |
| 6 | NS | N | E | R |
| 7 | NS | P | NE | R |
| 8 | NS | P | E | WR |

13. The Process of claim 12 wherein said step of determining the membership of said available capacity includes using membership functions $\mu_{NE}$, $\mu_E$, $\mu_N$, $\mu_P$, $\mu_S$, $\mu_{NS}$, $\mu_R$, $\mu_{WR}$, $\mu_{WA}$, and $\mu_A$ given by:

$$\mu_{NE}(C_a)=g(Ca;O,NE_e,O,NE_w)$$

$$\mu_E(C_a)=g(Ca;E_e,C,E_w,O)$$

$$\mu_N(y)=g(y;-y_{max},N_e,O,N_w)$$

$$\mu_P(y)=g(y;P_e,y_{max},P_w,O)$$

$$\mu_S(p_1)=g(p_1;O,S_e,O,S_w)$$

$$\mu_{NS}(p_1)=g(p_1;NS_e,1,NS_w,O)$$

$$\mu_R(z)=f(z;R_c,O,O)$$

$$\mu_{WR}(z)=f(z;WR_c,O,O)$$

$$\mu_{WA}(z)=f(z;WA_c,O,O)$$

$$\mu_A(z)=f(z;A_c,O,O)$$

where $g(x;x_0,x_1,a_0,a_1)$ is a trapezoidal function with trapezoidal plateau ordinate of 1 and with left trapezoidal plateau abscissa edge point $x_0$, right trapezoidal plateau abscissa edge point $x_1$, left triangular portion abscissa width $a_0$ and right triangular portion abscissa width $a_1$, where $f(x;x_0,a_0,a_1)$ is a triangle function with maximum ordinate of 1 with abscissa center point $x_0$, left triangle portion width $a_0$ and right triangular portion width $a_1$ and where $y_{max}$ is the maximum percentage of cells which are prohibited from entering the network where $NE_e$, $NE_w$, $E_e$, $E_w$, $N_e$, $N_w$, $P_e$, $P_w$, $S_e$, $S_w$, $NS_e$, $NS_w$, $R_c$, $WR_c$, $WA_c$, and $A_c$ are predetermined constants, where $WR_c=(R_c+z_a)/2$ and $WA_c=(A_c+z_a)/2$, where $z_a$ is a predetermined acceptance threshold $R_c \leq z_a \leq A_c$ and wherein z indicates that said new communication can be admitted only if $z > z_a$.

14. A node in an ATM communications network comprising:

at least one output queue for temporarily storing cells for transmission in an outgoing bitstream, and a fuzzy logic traffic controller for controlling the receipt of cells at said at least one queue by controlling admission of new communications into said node and for controlling congestion at said node, said fuzzy logic traffic controller comprising:

a fuzzy congestion controller for evaluating a first set of fuzzy logic rules on an occupancy q, rate of variation of queue occupancy $\Delta q$ and cell loss probability $p_1$ traffic parameters of said at least one queue corresponding to a type of communication controlled by said node to determine a traffic load adjustment parameter y, and for outputting a signal for adjusting the rate at which cells are generated which depends on said traffic load adjustment parameter y to each other node which generates cells for each of said types of communications controlled by said node, a fuzzy bandwidth calculator for receiving at said node, peak bandwidth $R_p$, mean bandwidth $R_m$ and burst duration $T_p$ transmission rate parameters of said new communication from another node which issued a request to admit said new communication, and for evaluating a second set of fuzzy logic rules on said transmission rate parameters $R_p$, $R_m$ and $T_p$ to determine a bandwidth capacity requirement $C_e$ of said new communication, and a fuzzy admission controller for evaluating a third set of fuzzy logic rules on at an allocatable bandwidth capacity $C_a$ which depends on said bandwidth capacity requirement parameter $C_e$ to determine a decision signal z indicating whether or not to admit said new communication.

* * * * *